(12) United States Patent
Miki et al.

(10) Patent No.: US 10,818,920 B2
(45) Date of Patent: Oct. 27, 2020

(54) NEGATIVE ELECTRODE ACTIVE MATERIAL FOR ELECTRICAL DEVICE

(71) Applicant: Nissan Motor Co., Ltd., Yokohama-shi, Kanagawa (JP)

(72) Inventors: Fumihiro Miki, Kanagawa (JP); Manabu Watanabe, Kanagawa (JP); Nobutaka Chiba, Kanagawa (JP); Kei Kitaura, Kanagawa (JP); Tohru Wada, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/351,064

(22) Filed: Mar. 12, 2019

(65) Prior Publication Data

US 2019/0214643 A1    Jul. 11, 2019

Related U.S. Application Data

(62) Division of application No. 14/897,451, filed as application No. PCT/JP2014/063252 on May 19, 2014, now Pat. No. 10,290,867.

(30) Foreign Application Priority Data

Jun. 12, 2013 (JP) .................................. 2013-123989

(51) Int. Cl.
*H01M 4/38* (2006.01)
*H01M 10/0525* (2010.01)
(Continued)

(52) U.S. Cl.
CPC .......... *H01M 4/386* (2013.01); *C22C 1/0483* (2013.01); *C22C 13/00* (2013.01); *C22C 28/00* (2013.01);
(Continued)

(58) Field of Classification Search
CPC .. H01M 4/386; H01M 10/0525; H01M 4/387; H01M 4/42; H01M 2004/027;
(Continued)

(56) References Cited

U.S. PATENT DOCUMENTS

2006/0040182 A1    2/2006  Kawakami et al.
2006/0147800 A1*   7/2006  Sato ...................... H01M 4/134
                                                     429/231.95

(Continued)

FOREIGN PATENT DOCUMENTS

JP    2004311429 A    11/2004
JP    2004349016 A    12/2004
(Continued)

OTHER PUBLICATIONS

M. A. Al-Maghrabi et al., A Combinatorial Study of the Sn—Si—C System for Li-Ion Battery Applications, Journal of the Electrochemical Society, Apr. 2, 2012, vol. 159, issue 6, pp. A711-A719, [online].

*Primary Examiner* — Andrew J. Oyer
(74) *Attorney, Agent, or Firm* — Young Basile Hanlon & MacFarlane, P.C.

(57) ABSTRACT

A negative electrode active material having high cycle durability contains an alloy represented by the following chemical formula (1):

$$Si_xSn_yM_zA_a \qquad (1)$$

wherein M is Zn, A is unavoidable impurities, x, y, z, and a represent % by mass values, and in that case, $0<x<100$, $0<y<100$, $0<z<100$, $0 \le a<0.5$, and $x+y+z+a=100$, in which the half width of the diffraction peak of the (111) surface of Si in the range of $2\theta=24$ to $33°$ by X ray diffraction measurement of the alloy using CuKα ray is 0.7° or more, and the x is more than 23 and less than 64, the y is 4 or more and less than 34, and the z is more than 0 and less than 65.

5 Claims, 22 Drawing Sheets

(51) Int. Cl.
  *C22C 30/04*   (2006.01)
  *C22C 28/00*   (2006.01)
  *C22C 1/04*    (2006.01)
  *C22C 29/06*   (2006.01)
  *C22C 13/00*   (2006.01)
  *C22C 29/18*   (2006.01)
  *H01M 4/42*    (2006.01)
  *H01M 4/02*    (2006.01)
  *H01M 10/052*  (2010.01)

(52) U.S. Cl.
  CPC ............... *C22C 29/06* (2013.01); *C22C 29/18* (2013.01); *C22C 30/04* (2013.01); *H01M 4/387* (2013.01); *H01M 4/42* (2013.01); *H01M 10/0525* (2013.01); *H01M 10/052* (2013.01); *H01M 2004/027* (2013.01)

(58) Field of Classification Search
  CPC ...... H01M 10/052; C22C 30/04; C22C 28/00; C22C 29/06; C22C 1/0483; C22C 29/18; C22C 13/00
  See application file for complete search history.

(56) References Cited

U.S. PATENT DOCUMENTS

| | | |
|---|---|---|
| 2009/0061322 A1 | 3/2009 | Kawakami et al. |
| 2010/0119942 A1* | 5/2010 | Kumar .................. H01M 4/38 429/220 |
| 2010/0167126 A1 | 7/2010 | Christensen et al. |

FOREIGN PATENT DOCUMENTS

| | | |
|---|---|---|
| JP | 2008123814 A | 5/2008 |
| JP | 2009517850 A | 4/2009 |
| WO | 2007064531 A1 | 6/2007 |

* cited by examiner

NEGATIVE ELECTRODE ACTIVE MATERIAL FOR ELECTRICAL DEVICE

CROSS REFERENCE TO RELATED APPLICATIONS

This application is a divisional application of U.S. patent application Ser. No. 14/897,451 filed on Dec. 10, 2015, which claims priority to Japanese Patent Application No. 2013-123989, filed on Jun. 12, 2013, both of which are herein incorporated by reference.

TECHNICAL FIELD

The present invention relates to a negative electrode active material for an electric device and an electric device using the same. The negative electrode active material for an electric device of the present invention and the electric device using the same are used, in the form of a secondary battery, a capacitor, or the like, as a power source or an auxiliary power source for driving a motor of vehicles like an electric vehicle, a fuel cell vehicle, and a hybrid electric vehicle.

BACKGROUND

In recent years, to cope with air pollution or global warming, reducing the amount of carbon dioxide is strongly desired. In the automobile industry, reducing the amount of carbon dioxide emission by introducing an electric vehicle (EV) or a hybrid electric vehicle (HEV) is attracting attention, and thus development of an electric device like a secondary battery for driving a motor, which plays a key role in commercialization, is actively under progress.

Compared to a consumer lithium ion secondary battery for a cellular phone, a notebook computer or the like, the motor-driving secondary battery is required to have very high output characteristics and very high energy. Thus, among the all batteries, the focus is made on a lithium ion secondary battery having the highest theoretical energy, and a rapid development is now under progress.

In general, a lithium ion secondary battery has a configuration that a positive electrode in which a positive electrode active material is applied to both surfaces of a positive electrode current collector with the use of a binder and a negative electrode in which a negative electrode active material is applied to both surfaces of a negative electrode current collector with the use of a binder are connected to each other via an electrolyte layer and accommodated in a battery case.

Conventionally, a carbon.graphite-based material is used for a negative electrode of a lithium ion secondary battery, in terms of the charge and discharge cycle life and the cost advantage. However, the carbon.graphite-based negative electrode material performs charge and discharge operation by absorption and desorption of lithium ions to and from graphite crystals. As such, there is a disadvantage that the charge and discharge capacity equal to or higher than 372 mAh/g, which is the theoretical capacity obtained by $LiC_6$ as a compound with maximum Li introduction, cannot be obtained. Therefore, it is difficult for a carbon.graphite-based negative electrode material to secure a satisfactory level of capacity and energy density for practical use in a vehicle.

On the other hand, a material capable of forming an alloy with Li is expected as a negative electrode material for vehicle use due to the fact that the battery using this material improves in energy density compared to the battery suing a conventional carbon.graphite-based negative electrode material. For example, Si material exhibits absorption and desorption of lithium ions in an amount of 4.4 mol per mol as shown in the following reaction formula (A), and the theoretical capacity is 2100 mAh/g for $Li_{22}Si_5$ ($=Li_{4.4}Si$). Furthermore, when calculated as a value per Si weight, it has initial capacity of 3200 mAh/g.

$$Si+4.4Li^{+}+e^{-} \rightleftarrows Li_{4.4}Si \qquad (A)$$

In the lithium ion secondary battery, however, a negative electrode using a material capable of forming an alloy with Li shows high degree of expansion and shrinkage during charge and discharge operation. For example, while the graphite material shows volume expansion of about 1.2 times by absorption of Li ions, the Si material exhibits a large volume change (about 4 times) by transition from amorphous to crystal phase during alloying of Si with Li. This results in a deterioration of cycle life of an electrode. Furthermore, the Si negative electrode active material has a trade-off relationship between capacity and cycle durability so that it is difficult to improve the cycle durability while securing the high capacity.

To solve those problems, a negative electrode active material for a lithium ion secondary battery containing an amorphous alloy with formula $Si_xM_yAl_z$ has been suggested (for example, see JP-A-2009-517850 (WO 2007/064531 A1)). In the formula, x, y, and z represent atomic percentage values, x+y+z=100, x≥55, y<22, and z>0, and M is a metal consisting of at least one of Mn, Mo, Nb, W, Ta, Fe, Cu, Ti, V, Cr, Ni, Co, Zr, and Y. According to the invention described in JP-A-2009-517850 (WO 2007/064531 A1), it is disclosed in paragraph [0008] that it is possible to attain not only high capacity but also good cycle life by minimizing the content of metal M.

Although it is described in JP-A-2009-517850 (WO 2007/064531 A1) that a lithium ion secondary battery using a negative electrode active material, which contains an amorphous alloy with formula $Si_xM_yAl_z$, can exhibit good cycle durability, it cannot be said that the cycle durability is sufficient.

SUMMARY

Accordingly, an object of the present invention is to provide a negative electrode active material for an electric device like lithium ion secondary battery having high cycle durability.

Inventors of the present invention have intensively studied to solve the above problems. As a result, it was found that the problem can be solved when a ternary Si alloy having a combination of specific elements and a specific composition is used and the half width (FWHM) of a diffraction peak of the (111) surface of Si in the range of 2θ=24 to 33° by X ray diffraction measurement of the alloy using CuKα ray is within a specific range, thereby completing the present invention.

Namely, the present invention relates to a negative electrode active material for an electric device. The negative electrode active material for an electric device is characterized in that it contains an alloy represented by the following chemical formula (1):

$$Si_xSn_yM_zA_a \qquad (1)$$

(in the chemical formula (1), M is at least one metal selected from the group consisting of Ti, Zn, C, and a combination thereof, A is unavoidable impurities, x, y, z, and a represent % by mass values, and in that case, 0<x<100, 0<y<100, 0<z<100, 0≤a<0.5, and x+y+z+a=100). It is also characterized in that the half width (FWHM) of the diffraction peak of the (111) surface of Si in the range of 2θ=24 to 33° by X ray diffraction measurement of the alloy using CuKα ray is 0.7° or more.

BRIEF DESCRIPTION OF THE DRAWINGS

In FIG. 1, 10 indicates a lithium ion secondary battery (stack type battery); 11 indicates a negative electrode current collector; 12 indicates a positive electrode current collector; 13 indicates a negative electrode active material layer; 15 indicates a positive electrode active material layer; 17 indicates an electrolyte layer; 19 indicates a single battery layer; 21 indicates a power generating element; 25 indicates a negative electrode current collecting plate; 27 indicates a positive electrode current collecting plate; and 29 indicates a battery outer casing (laminate film);

In FIG. 2, 50 indicates a lithium ion secondary battery (stack type battery); 57 indicates a power generating element; 58 indicates negative electrode current collecting plate; 59 indicates a positive electrode current collecting plate; and 52 indicates a battery outer casing (laminate film);

DESCRIPTION OF THE EMBODIMENTS

Figure 1:
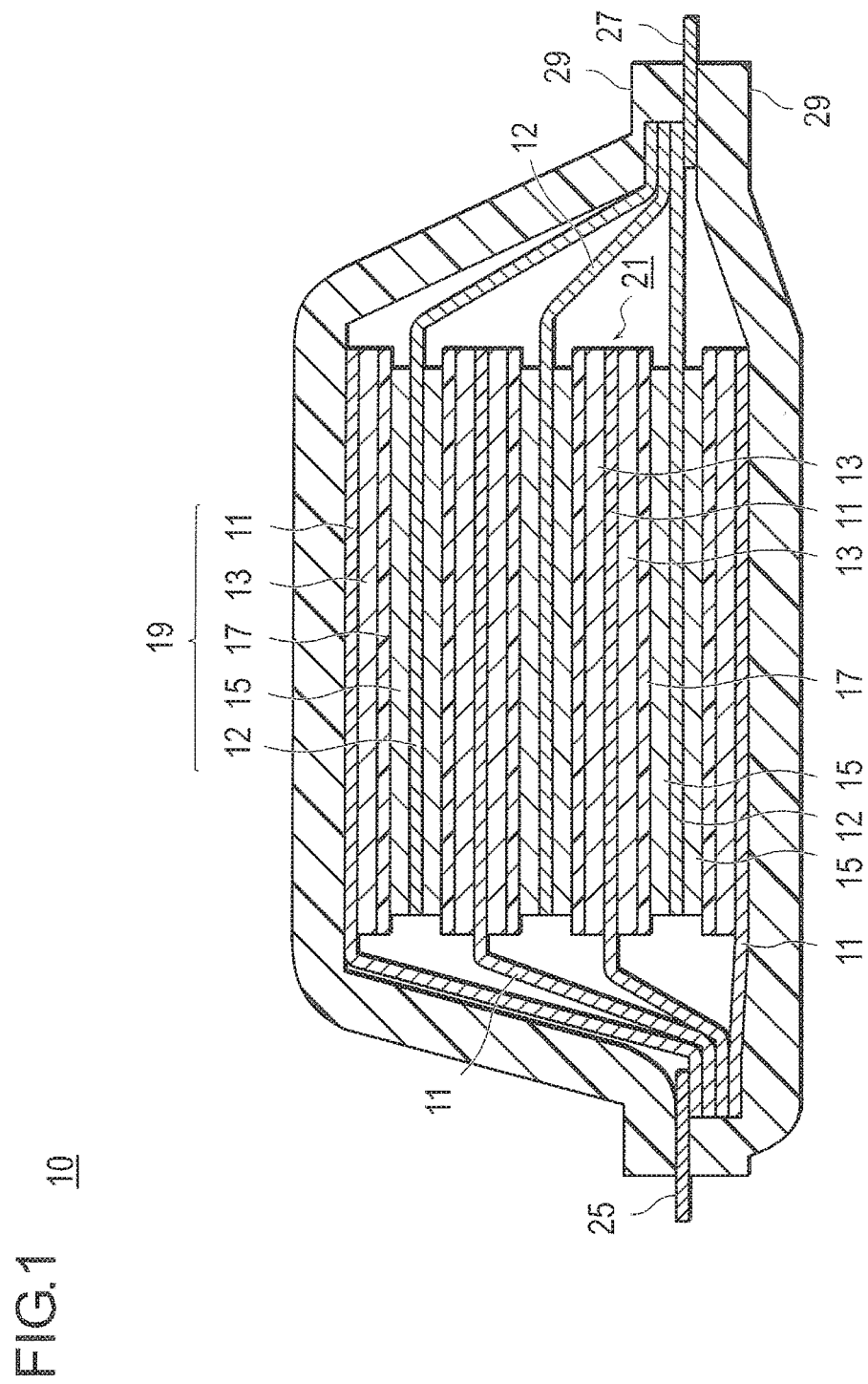
FIG. 1 is a cross-sectional view schematically illustrating the outline of a flat and non-bipolar type lithium ion secondary battery as one representative embodiment of the electric device of the present invention.

Hereinbelow, embodiments of a negative electrode active material for an electric device of the present invention and an electric device using it will be described with reference to the drawings. However, the technical scope of the present invention should be determined based on the descriptions of the claims and it is not limited to the embodiments that are given below. Meanwhile, the same elements are given with the same symbols for the descriptions of the drawings, and overlapped explanations are omitted. Furthermore, note that dimensional ratios in the drawings are exaggerated for the sake of description, and can be different from actual ratios in some cases.

Hereinbelow, the basic constitution of an electric device to which the negative electrode active material for an electric device of the present invention can be applied will be described with the use of the drawings. In this embodiment, explanations are given by having a lithium ion secondary battery as an example of an electric device. Meanwhile, as described herein, the "electrode layer" means the composite layer containing a negative electrode active material, a conductive aid, and a binder. In the explanations given herein, it may be also referred to as a "negative electrode active material layer". Similarly, the electrode layer at positive electrode side may be also referred to as a "positive electrode active material layer".

First, according to the negative electrode for a lithium ion secondary battery as a representative embodiment of the negative electrode containing the negative electrode active material for an electric device of the present invention and the lithium ion secondary battery that is obtained by using it, the cell (single battery layer) has high voltage so that high energy density and high output density can be achieved. As such, the lithium ion secondary battery obtained by using the negative electrode active material for a lithium ion secondary battery of this embodiment is favorable as a power source or an auxiliary power source for driving a vehicle. As a result, it can be preferably used as a lithium ion secondary battery like power source for driving a vehicle. In addition, it is also fully applicable to a lithium ion secondary battery for a portable device like a cellular phone.

Namely, it is sufficient that the lithium ion secondary battery as a subject of this embodiment is formed by using the negative electrode active material for a lithium ion secondary battery of this embodiment described below, and other constitutional requirements are not particularly limited.

For example, when the lithium ion secondary battery is classified in terms of shape and structure, it can be applied to any shape and structure that are conventional known, for example, stack type (flat type) battery, a wound type (barrel type) battery, or the like. When a stack type (flat type) battery structure is employed, long term reliability can be guaranteed based on a sealing technique like simple thermal press, and thus it is advantageous in terms of cost and workability.

Furthermore, when the lithium ion secondary battery is determined in terms of electric connection form within a lithium ion secondary battery (electrode structure), it can be applied to any one of non-bipolar type (internal parallel connection type) battery and bipolar (internal series connection type) battery.

When the lithium ion secondary battery is classified in terms of the type of an electrolyte layer in a lithium ion secondary battery, it can be applied to any conventionally known electrolyte layer type like a solution electrolyte type battery in which a solution electrolyte like non-aqueous electrolyte solution is used for an electrolyte layer and a polymer battery in which a polymer electrolyte is used for an electrolyte layer. The polymer battery is classified into a gel electrolyte type battery using a polymer gel electrolyte (also simply referred to as a gel electrolyte) and a solid polymer (all-solid) type battery using a polymer solid electrolyte (also simply referred to as a polymer electrolyte).

Thus, based on the drawings, very simple explanations are given for the non-bipolar type (internal parallel connection type) lithium ion secondary battery obtained by using the negative electrode active material for a lithium ion secondary battery of this embodiment. However, the technical scope of the lithium ion secondary battery of this embodiment is not limited to them.

<Overall Structure of Battery>

FIG. 1 is a cross-sectional view schematically illustrating the overall structure of a flat type (stack type) lithium ion secondary battery as one representative embodiment of the electric device of the present invention (hereinbelow, it is also simply referred to as a "stack type battery").

As shown in FIG. 1, the stack type battery 10 according to this embodiment has a structure in which the power generating element 21 with a substantially rectangular shape, in which an charge and discharge reaction actually occurs, is sealed inside of the laminate sheet 29 as a battery outer casing material. Herein, the power generating element 21 has a constitution in which a positive electrode, in which a positive electrode active material layer 15 is applied to both surfaces of a positive electrode current collector 12, an electrolyte layer 17, and a negative electrode, in which a negative electrode active material layer 13 is applied to both surfaces of a negative electrode current collector 11, are stacked. Specifically, the negative electrode, the electrolyte layer, and the positive electrode are stacked in this order such that one positive electrode active material layer 15 and the negative electrode active material layer 13 adjacent thereto can face each other via the electrolyte layer 17.

Accordingly, the positive electrode, the electrolyte layer, and the negative electrode that are adjacent to each other form one single battery layer 19. Thus, it can be also said that, as plural single battery layers 19 are stacked, the stack type battery 10 shown in FIG. 1 has a constitution in which electric parallel-connection is made. Meanwhile, on the outermost positive electrode current collector which is present on both outermost layers of the power generating element 21, the positive electrode active material layer 15 is disposed only on a single surface. However, the active material layer may be formed on both surfaces. Namely, instead of having a current collector exclusive for the outermost layer in which an active material layer is formed only on a single surface, a current collector having an active material layer on both surfaces can be directly used as a current collector for the outermost layer. Furthermore, it is also possible that, by reversing the arrangement of the negative electrode and positive electrode of FIG. 1, the outermost negative electrode current collector is disposed on both outermost layers of the power generating element 21 and the negative electrode active material layer is disposed on a single surface or both surfaces of the corresponding outermost negative electrode current collector.

The positive electrode current collector 12 and negative electrode current collector 11 have a structure in which each of the positive electrode current collecting plate 25 and negative electrode current collecting plate 27, which conductively communicate with each electrode (positive electrode and negative electrode), is attached and inserted to the end part of the laminate sheet 29 so as to be led to the outside of the laminate sheet 29. If necessary, the positive electrode current collecting plate 27 and negative electrode current collecting plate 25 may be attached, by ultrasonic welding or resistance welding, to the positive electrode current collector 12 and the negative electrode current collector 11 of each electrode via the positive electrode terminal lead and a negative electrode terminal lead (not illustrated), respectively.

The lithium ion secondary battery explained above has a characteristic in the negative electrode. Hereinbelow, main constitutional members of a battery having the above negative electrode will be explained.

<Active Material Layer>

The active material layer 13 or 15 contains an active material, and if necessary, further contains other additives.

[Positive Electrode Active Material Layer]

The positive electrode active material layer 15 contains a positive electrode active material.

(Positive Electrode Active Material)

Examples of the positive electrode active material include metal lithium, lithium-transition metal composite oxide, lithium-transition metal phosphoric acid compound, lithium-transition metal sulfuric acid compound, solid-solution based, ternary based, NiMn-based, NiCo-based, spinel Mn-based or the like.

Examples of the lithium-transition metal composite oxide include $LiMn_2O_4$, $LiCoO_2$, $LiNiO_2$, $Li(Ni, Mn, Co)O_2$, $Li(Li, Ni, Mn, Co)O_2$, $LiFePO_4$, a compound in which part of the transition metal is replaced with other element or the like.

Examples of the solid-solution based include $xLiMO_2 \cdot (1-x)Li_2NO_3$ ($0<x<1$, M represents one or more transition metal of which average oxidation state is 3+, and N represents one or more transition metal of which average oxidation state is 4+), $LiRO_2$—$LiMn_2O_4$ (R=transition metal element like Ni, Mn, Co, and Fe) or the like.

Examples of the ternary-based include nickel.cobalt.manganese (composite) positive electrode material or the like.

Examples of the NiMn-based include $LiNi_{0.5}Mn_{1.5}O_4$ or the like.

Examples of the NiCo-based include $Li(NiCo)O_2$ or the like.

Examples of the spinel Mn-based include $LiMn_2O_4$ or the like.

It is also possible to use, as a positive electrode active material, a layered transition metal oxide which is represented by the general formula $Li_{(2-0.5x)y}\square_{(2-0.5x)(1-y)}Mn_{1-x}M_{1.5x}O_3$ described in JP-A-2012-185913 (wherein, Li represents lithium, $\square$ represents the pore in crystal structure, Mn represents manganese, M represents $Ni_\alpha Co_\beta Mn_\gamma$ (Ni is nickel, Co is cobalt, Mn is manganese, and $\alpha$, $\beta$ and $\gamma$ satisfy the conditions of $0<\alpha\leq0.5$, $0\leq\beta\leq0.33$, and $0<\gamma\leq0.5$), and x and y satisfy the conditions of $0<x<1.00$ and $0<y<1.00$) and has a crystal structure belonging to the space group of C2/m.

Depending on the case, two or more types of a positive electrode active material can be used in combination. From the viewpoint of capacity and output characteristics, the lithium-transition metal composite oxide is preferably used as a positive electrode active material. Meanwhile, it is needless to say that the positive electrode active material other than those described above can be also used. When the optimum particle diameter is different for exhibiting unique effect of each active material, those having optimum particle diameter can be used with blending for exhibiting the unit effect of each, and it is not necessary to have a uniform particle diameter for all active materials.

The average particle diameter of the positive electrode active material to be contained in the positive electrode active material layer 15 is, although not particularly limited, preferably 1 to 30 μm, and more preferably 5 to 20 μm from the viewpoint of having high output. As described herein, "particle diameter" means the longest distance among the distance between arbitrary two points on the outline of an active material particle (observation surface) that is observed by using an observation means like a scanning type electron microscope (SEM) or a transmission type electron microscope (TEM). Furthermore, as described herein, as for the "average particle diameter", a value calculated as a mean value of particle diameter of the particles that are observed in several to several tens of observational views by using an observation means like a scanning type electron microscope (SEM) or a transmission type electron microscope (TEM) is used. Particle diameter or average particle diameter of other constitutional components can be also similarly defined.

The positive electrode active material layer 15 may contain a binder.

(Binder)

The binder is added for the purpose of binding between active materials or binding between active material and current collector so as to maintain the electrode structure. The binder used for the positive electrode active material layer is not particularly limited and the following materials can be mentioned; thermoplastic polymers such as polyethylene, polypropylene, polyethylene terephthalate (PET), polyether nitrile (PEN), polyacrylonitrile, polyimide, polyamide, polyamideimide, cellulose, carboxymethyl cellulose (CMC), an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), an epoxy resin, and the like. Among them, preferred are polyvinylidene fluoride, polyimide, styrene-butadiene rubber, carboxymethyl cellulose, polypropylene, polytetrafluoroethylene, polyacrylonitrile, polyamide, and polyamideimide. Those preferred binders have excellent heat resistance and a very broad potential window. As such, they are stable at both of the positive electrode potential and the negative electrode potential, and can be used for an active material layer. These binders may be each used singly, or two or more thereof may be used in combination.

Amount of the binder contained in the positive electrode active material layer is, although not particularly limited as long as the binder can bind an active material, preferably 0.5 to 15% by mass, and more preferably 1 to 10% by mass relative to the active material layer.

The positive electrode (positive electrode active material layer) can be formed by any method like kneading method, sputtering method, vapor deposition method, CVD method, PVD method, ion plating method, and thermal spraying method, in addition to a general method of applying (coating) a slurry.

[Negative Electrode Active Material Layer]

The negative electrode active material layer 13 contains a negative electrode active material.

As a ternary-based alloy of $Si_xSn_yM_zA_a$ is used and the half width (FWHM) of a diffraction peak of the (111) surface of Si in the range of 2θ=24 to 33° by X ray diffraction measurement of the alloy using CuKα ray is set within a specific range, the effect of improving the cycle life by suppressing the phase transition between amorphous and crystal at the time of alloying Si and Li is obtained. As a result, the negative electrode using the negative electrode active material of the present invention has an advantageous effect of having high cycle durability.

(Negative Electrode Active Material)

The negative electrode active material essentially contains a specific alloy.

Alloy

According to this embodiment, the alloy is represented by the following chemical formula (1).

$$Si_xSn_yM_zA_a \quad (1)$$

In the chemical formula (1), M is at least one metal selected from the group consisting of Ti, Zn, C, and a combination thereof. Furthermore, A is unavoidable impurities. Furthermore, x, y, z, and a represent % by mass values, and in that case, $0<x<100$, $0<y<100$, $0<z<100$, $0 \leq a<0.5$, and $x+y+z+a=100$. As described herein, the term "unavoidable impurities" indicates, in the Si alloy, those present in a raw material or those unavoidably incorporated during the production process. Although they are basically not necessary, the unavoidable impurities are acceptable impurities as they are present in a trace amount and have no influence on the characteristics of a Si alloy.

In this embodiment, as for the negative electrode active material, by selecting Sn as a first added element and M as a second added element (at least one metal selected from the group consisting of Ti, Zn, C, and a combination thereof), the cycle life can be improved by suppressing the phase transition between amorphous and crystal at the time of alloying Li. Furthermore, compared to a negative electrode active material of a prior art, e.g., a carbon negative electrode active material, it can have higher capacity.

Herein, the necessity of suppressing the amorphous-crystal phase transition at the time of alloying Li is caused by the fact that the function of an active material is lost due to the disruption of the particle itself as a large volume change (about 4 times) occurs according to transition from an amorphous state to a crystal state at the time of alloying Si and Li in a Si material. For such reasons, by suppressing the amorphous-crystal phase transition, disruption of the particle itself is suppressed so that the function (high capacity) of an active material can be maintained and the cycle life can be improved. By selecting those first and second added elements, it is possible to provide a Si alloy negative electrode active material having high capacity and high cycle durability.

As described above, M is at least one metal selected from the group consisting of Ti, Zn, C, and a combination thereof. Hereinbelow, each Si alloy of $Si_xSn_yTi_zA_a$, $Si_xSn_yZn_zA_a$, and $Si_xSn_yC_zA_a$ will be explained respectively.

[Si Alloy Represented by $Si_xSn_yTi_zA_a$]

By selecting Sn and Ti as a first added element and a second added element, respectively, $Si_xSn_yTi_zA_a$ can have improved cycle life based on suppressed amorphous-crystal phase transition at the time of Li alloying as described above. Accordingly, compared to a negative electrode active material of a prior art, e.g., a carbon negative electrode active material, it can have higher capacity.

Regarding the alloy composition described above, it is preferable that x, y, and z satisfy the following mathematical formula (1) or (2):

$$35 \leq x \leq 78,\ 7 \leq y \leq 30,\ 0<z \leq 37 \quad (1)$$

$$35 \leq x \leq 52,\ 30 \leq y \leq 51,\ 0<z \leq 35 \quad (2).$$

Figure 3:
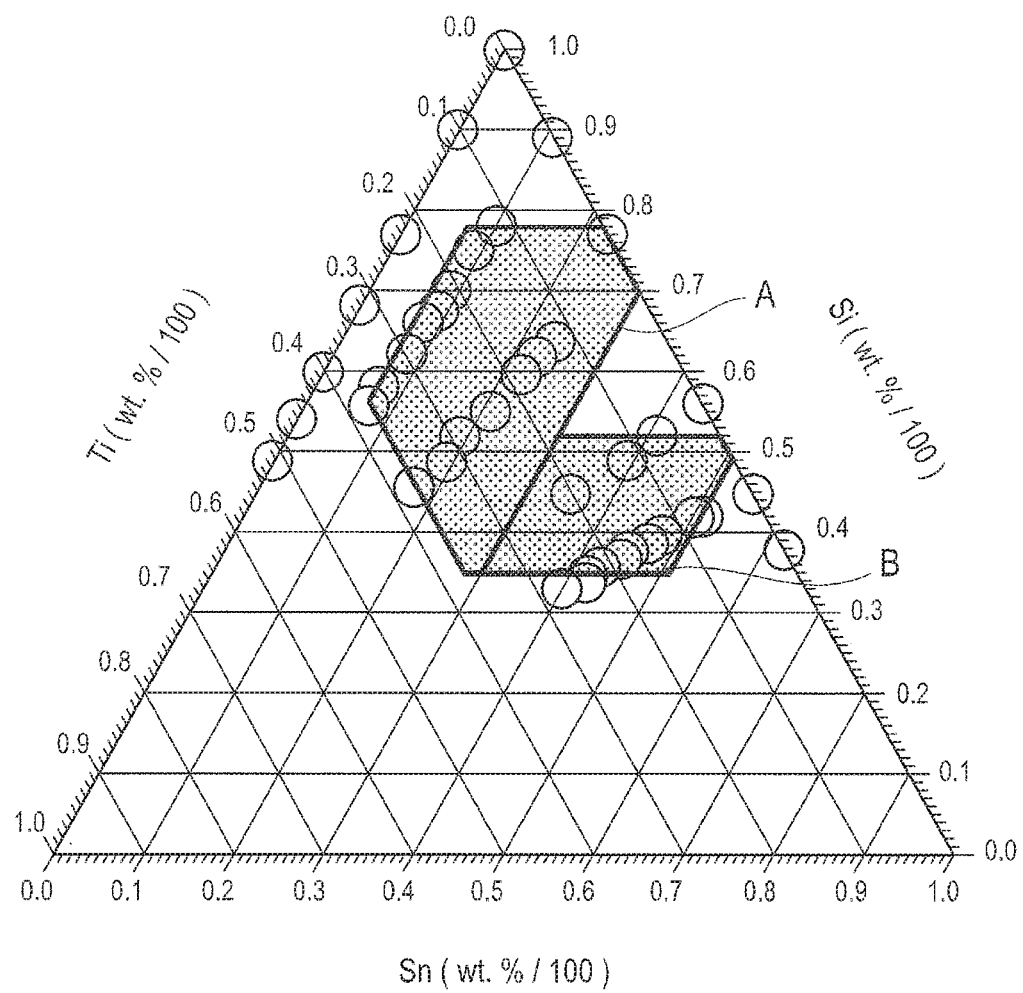
FIG. 3 is a ternary compositional diagram in which the alloy component formed into a film in Reference Example A is plotted, together with the preferred compositional range of Si—Sn—Ti based alloy constituting the negative electrode active material for an electric device of the present invention.

Namely, from the viewpoint of improvement of the above characteristics of a negative electrode active material, the first region is preferably a region in which 35% by mass or more and 78% by mass or less is silicon (Si), 7% by mass or more and 30% by mass or less is tin (Sn), more than 0% by mass and 37% by mass or less is titanium (Ti) as indicated by symbol A of FIG. 3. Furthermore, the second region is preferably a region in which 35% by mass or more and 52% by mass or less is Si, 30% by mass or more and 51% by mass or less is Sn, and more than 0% by mass and 35% by mass or less is Ti as indicated by symbol B of FIG. 3. When content of each component is within the aforementioned range, initial discharge capacity of more than 1000 Ah/g can be obtained, and also more than 90% (50 cycles) of the cycle life can be obtained.

Figure 4:
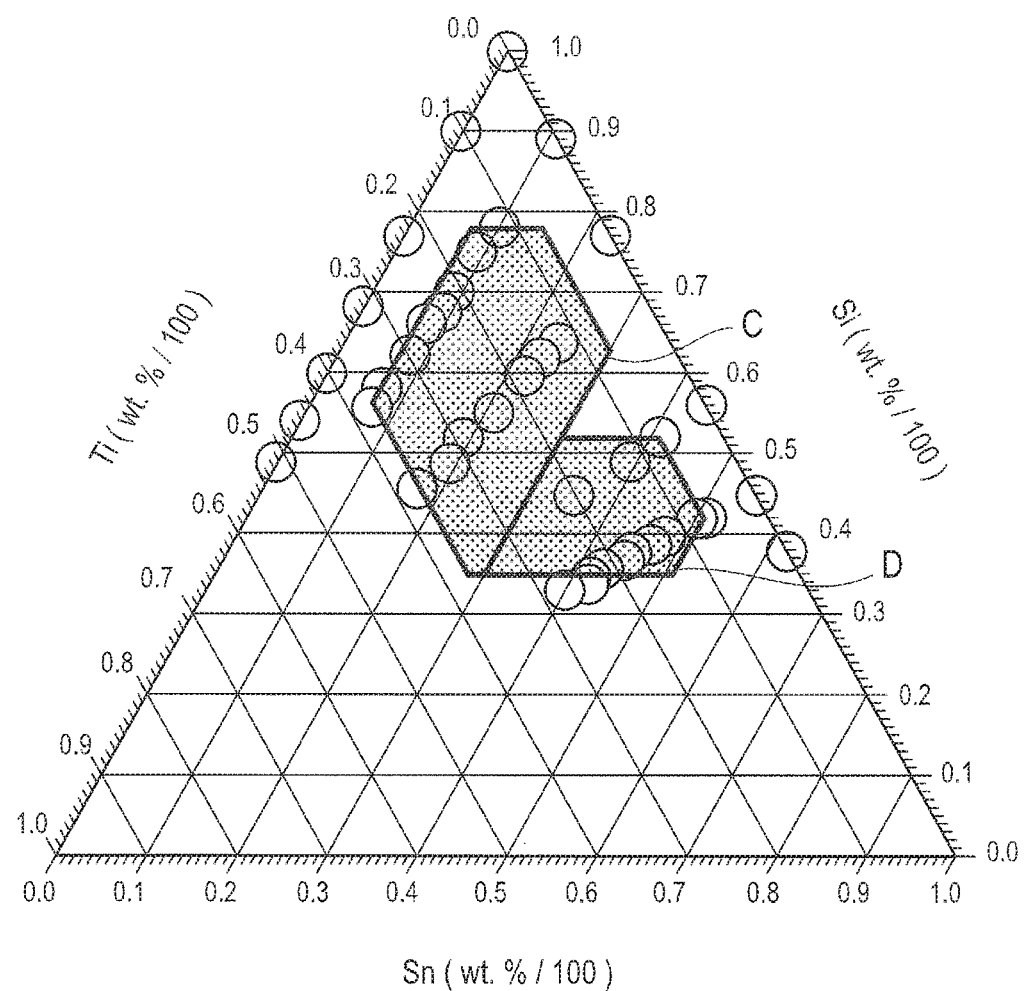
FIG. 4 is a ternary compositional diagram illustrating more preferred compositional range of Si—Sn—Ti based alloy constituting the negative electrode active material for an electric device of the present invention.

Meanwhile, from the viewpoint of further improvement of the above characteristics of a negative electrode active material, it is preferable that the content of titanium is in the range of 7% by mass or more. Namely, the first region is preferably a region in which 35% by mass or more and 78% by mass or less is silicon (Si), 7% by mass or more and 30% by mass or less is tin (Sn), 7% by mass or more and 37% by mass or less is titanium (Ti) as indicated by symbol C of FIG. 4. Furthermore, the second region is preferably a region in which 35% by mass or more and 52% by mass or less is Si, 30% by mass or more and 51% by mass or less is Sn, and 7% by mass or more and 35% by mass or less is Ti as indicated by symbol D of FIG. 4. Namely, it is preferable that x, y, and z satisfy the following math $$35 \leq x \leq 78,\ 7 \leq y \leq 30,\ 7 \leq z \leq 37 \quad (3)$$

$$35 \leq x \leq 52,\ 30 \leq y \leq 51,\ 7 \leq z \leq 35, \quad (4).$$

Accordingly, as described in the following Reference Examples, it is possible to increase the discharge capacity retention rate to 43% or more after 50 cycles.

Figure 5:
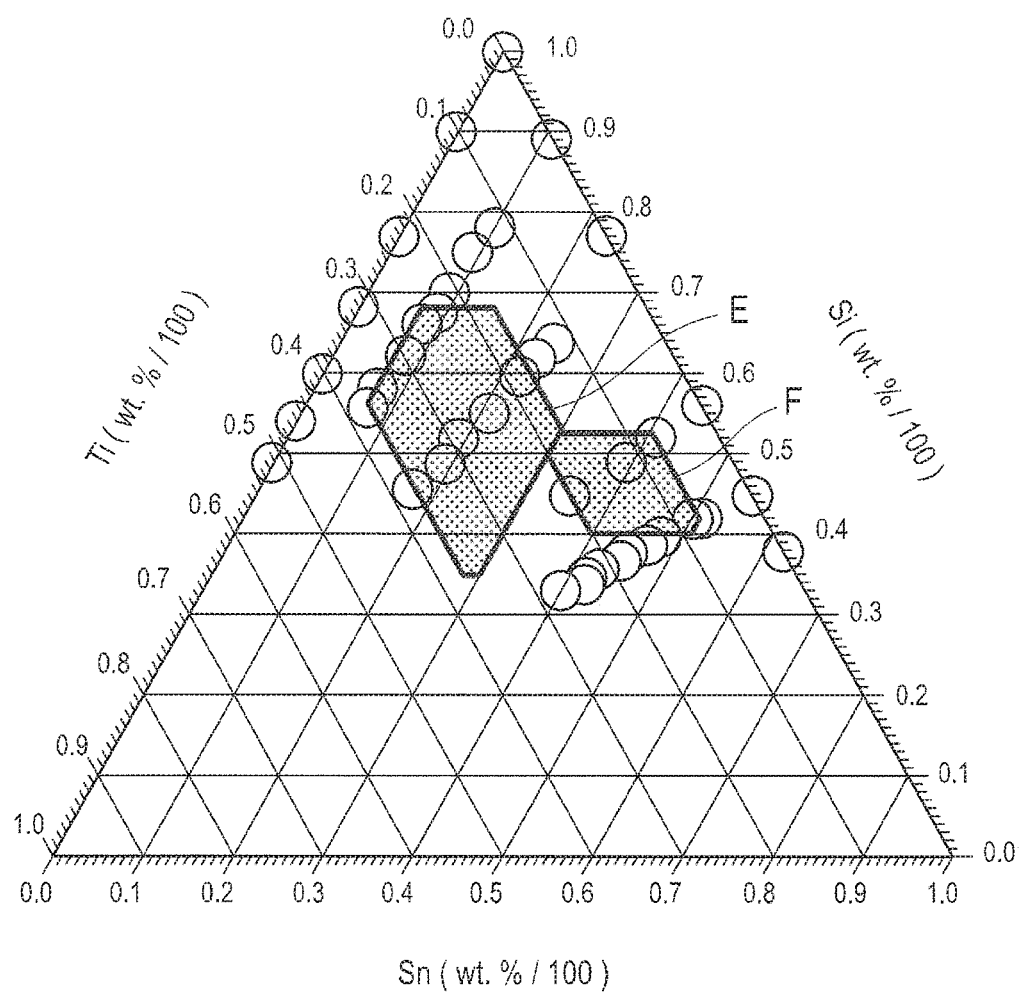
FIG. 5 is a ternary compositional diagram illustrating even more preferred compositional range of Si—Sn—Ti based alloy constituting the negative electrode active material for an electric device of the present invention.

Furthermore, from the viewpoint of ensuring good cycle durability, the first region is preferably a region in which 35% by mass or more and 68% by mass or less is Si, 7% by mass or more and 30% by mass or less is Sn, 18% by mass or more and 37% by mass or less is Ti as indicated by symbol E of FIG. 5. Furthermore, the second region is preferably a region in which 39% by mass or more and 52% by mass or less is Si, 30% by mass or more and 51% by mass or less is Sn, and 7% by mass or more and 20% by mass or less is Ti as indicated by symbol F of FIG. 5. Namely, it is preferable that x, y, and z satisfy the following mathematical formula (5) or (6):

$$35 \leq x \leq 68,\ 7 \leq y \leq 30,\ 18 \leq z \leq 37, \quad (5)$$

$$39 \leq x \leq 52,\ 30 \leq y \leq 51,\ 7 \leq z \leq 20, \quad (6).$$

Figure 6:
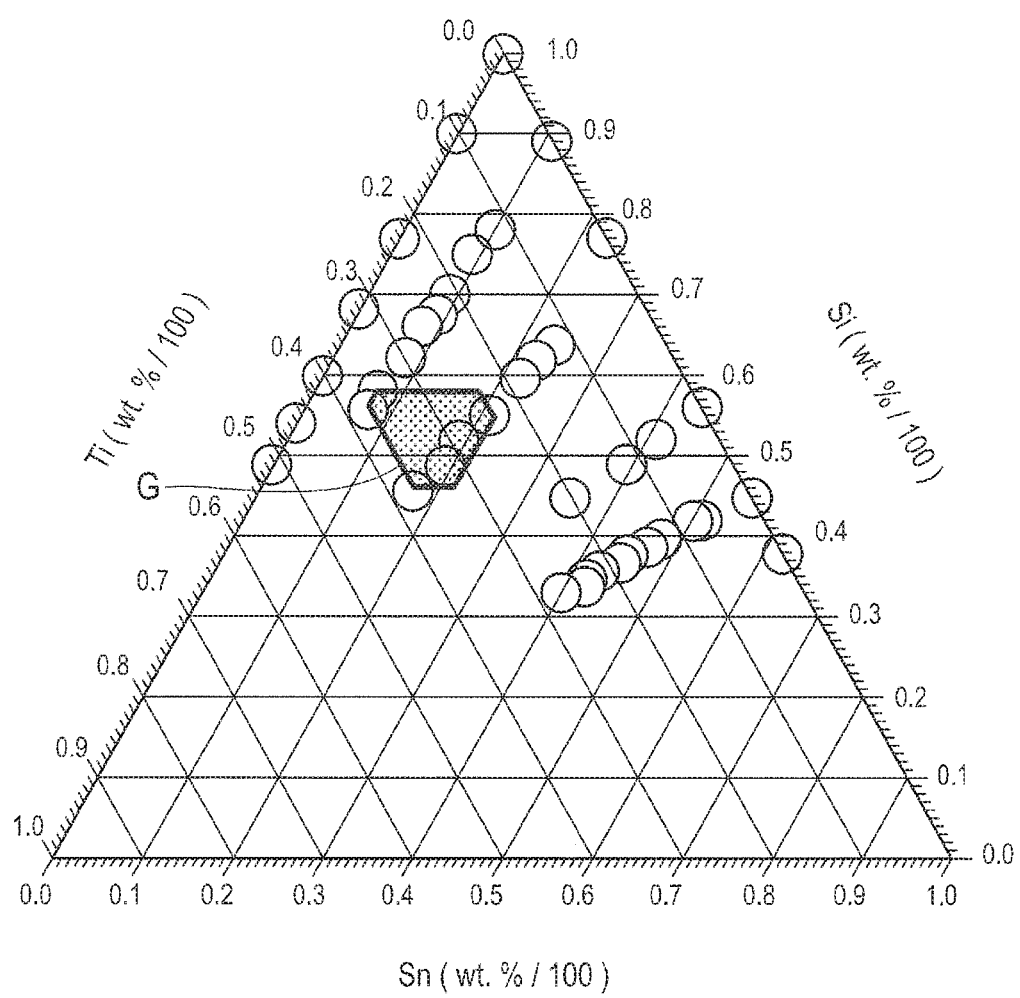
FIG. 6 is a ternary compositional diagram illustrating particularly preferred compositional range of Si—Sn—Ti based alloy constituting the negative electrode active material for an electric device of the present invention.

Furthermore, from the viewpoint of the initial discharge capacity and cycle durability, it is particularly preferable that the negative electrode active material of this embodiment has an alloy which contains a component in the region indicated by symbol G of FIG. 6 and the remaining is unavoidable impurities. Meanwhile, the region indicated by symbol G is a region in which 46% by mass or more and 58% by mass or less is Si, 7% by mass or more and 21% by mass or less is Sn, and 24% by mass or more and 37% by mass or less is Ti. Namely, it is preferable that x, y, and z satisfy the following mathematical formula (7):

$$46 \leq x \leq 58, 7 \leq y \leq 21, 24 \leq z \leq 37 \qquad (7).$$

Meanwhile, as explained above, A is impurities (unavoidable impurities) originating from a raw material or a production method other than the aforementioned three components. Regarding the a, it is $0 \leq a < 0.5$, and preferably $0 \leq a < 0.1$.

[Si Alloy Represented by $Si_xSn_yZn_zA_a$]

By selecting Sn and Zn as a first added element and a second added element, respectively, $Si_xSn_yZn_zA_a$ can have improved cycle life based on suppressed amorphous-crystal phase transition at the time of Li alloying as described above. Accordingly, compared to a negative electrode active material of a prior art, e.g., a carbon negative electrode active material, it can have higher capacity.

Regarding the aforementioned alloy composition, it is preferable that x is more than 23 and less than 64, y is 4 or more and 58 or less, and z is more than 0 and less than 65. Meanwhile, this numerical value range corresponds to the range which is indicated by symbol X in FIG. 10. Meanwhile, the negative electrode active material of this Si alloy is used for a negative of an electric device, for example a negative electrode of a lithium ion secondary battery. In that case, the alloy contained in the negative electrode active material absorbs lithium ions at charge of a battery and desorbs lithium ions at discharge of a battery.

More specifically, the negative electrode active material is a negative electrode active material of Si alloy, and tin (Sn) and zinc (Zn) are added thereto as a first added element and a second added element, respectively. Furthermore, by suitably selecting Sn and Zn as a first added element and a second added element, respectively, the amorphous-crystal phase transition at the time of being alloyed with Li is suppressed so that cycle life can be improved. Furthermore, it is possible to have a carbon negative electrode active material with higher capacity.

Furthermore, by optimizing the compositional range of Sn and Zn as a first added element and a second added element, respectively, a negative electrode active material of Si (Si—Sn—Zn based) alloy having good cycle life even after 50 cycles or 100 cycles can be obtained.

In that case, if x is more than 23 for the negative electrode active material composed of Si—Sn—Zn based alloy, the discharge capacity at the first cycle can be sufficiently secured. Furthermore, if y is 4 or more, good discharge capacity retention rate at the $50^{th}$ cycle can be sufficiently secured. When x, y, and z are within the compositional range described above, the cycle durability is improved and good discharge capacity retention rate at the $100^{th}$ cycle (e.g. 50% or more) can be sufficiently secured.

Figure 11:
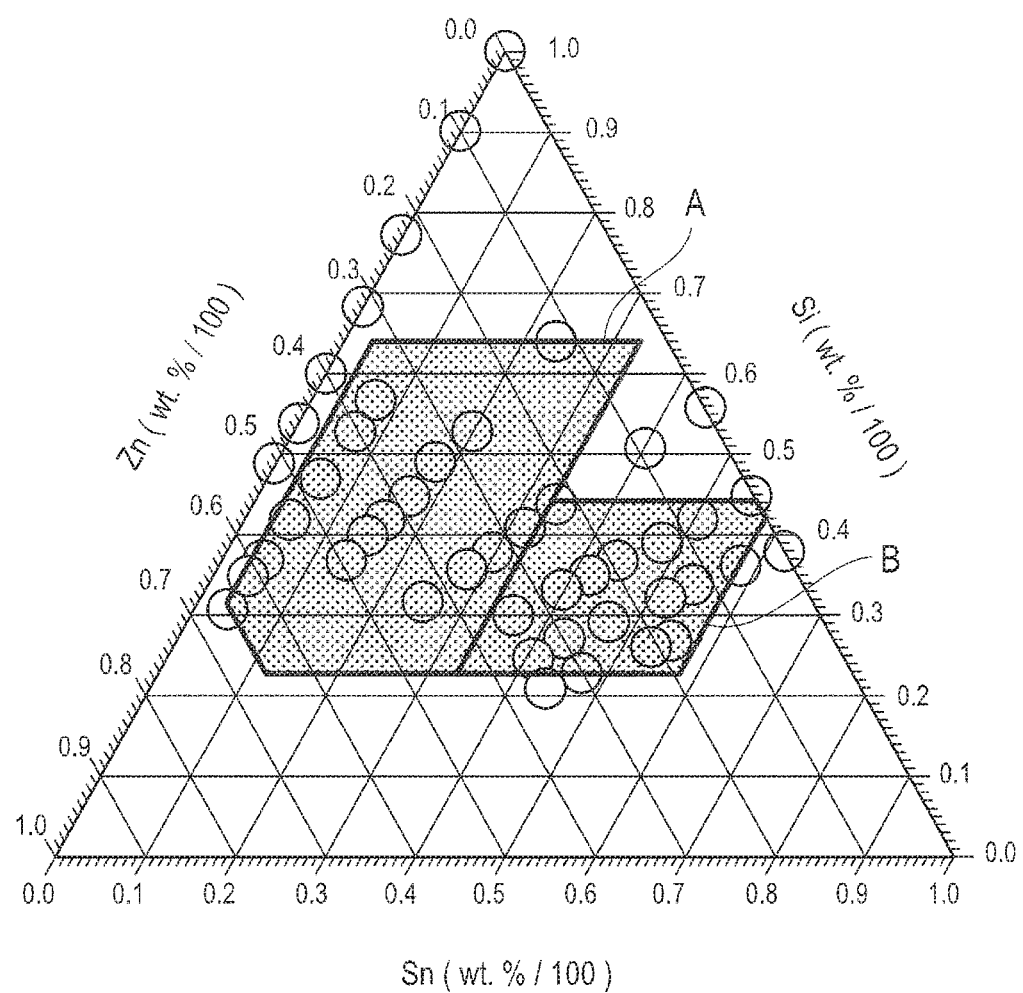
FIG. 11 is a ternary compositional diagram illustrating more preferred compositional range of Si—Sn—Zn based alloy constituting the negative electrode active material for an electric device of the present invention.
Figure 12:
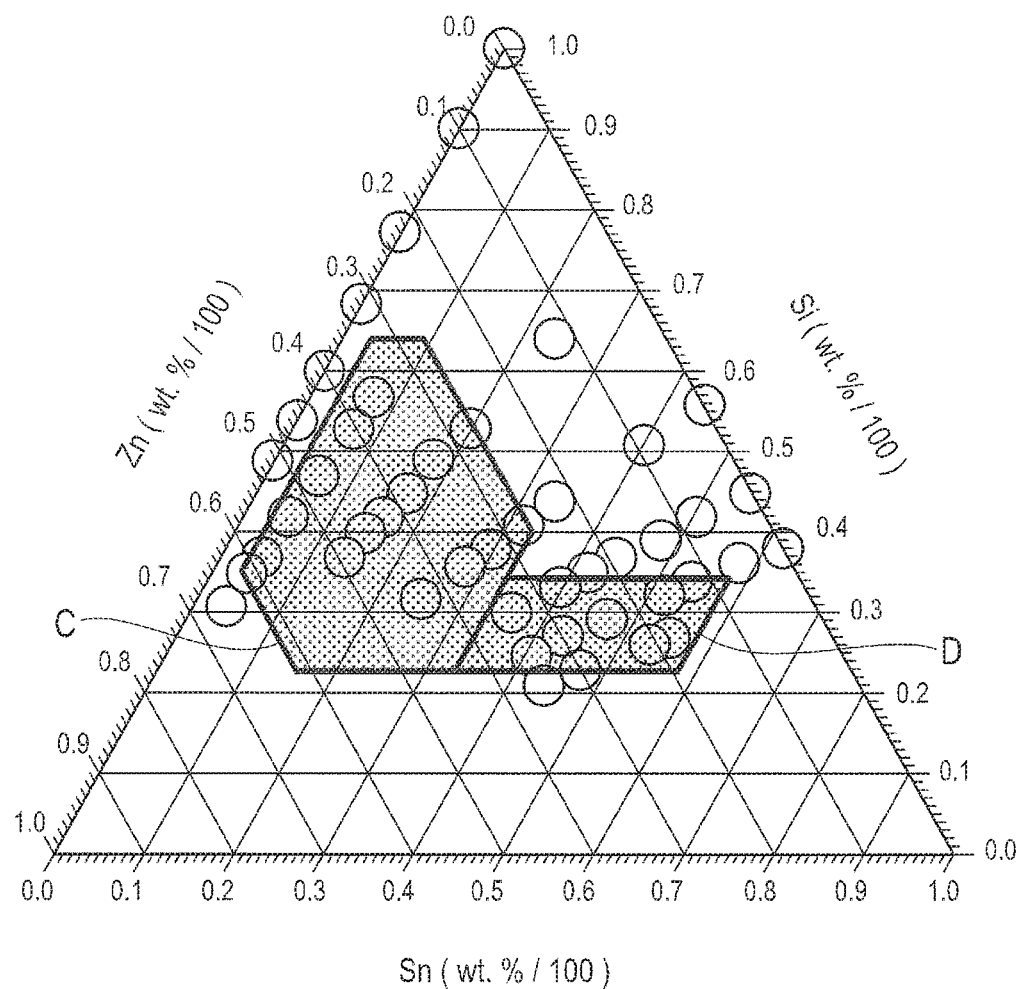
FIG. 12 is a ternary compositional diagram illustrating even more preferred compositional range of Si—Sn—Zn based alloy constituting the negative electrode active material for an electric device of the present invention.

Meanwhile, from the viewpoint of having further improvement of the above characteristics of the Si alloy negative electrode active material, it is preferable to have the range indicated by symbol A of FIG. 11 in which $23<x<64$, $4y \leq y<34$, and $2<z<65$ in the aforementioned alloy composition. It is also preferable to have the range indicated by symbol B of FIG. 11 satisfying $23<x<44$, $34<y<58$, and $0<z<43$. Accordingly, it is possible to obtain the discharge capacity retention rate of 92% or more at the $50^{th}$ cycle and the discharge capacity retention rate of more than 55% at the $100^{th}$ cycle as shown in Table 2. In addition, from the viewpoint of securing more favorable cycle durability, it is preferable to have the range indicated by symbol C of FIG. 12 satisfying $23<x<64$, $4<y<34$, and $27<z<61$. It is also preferable to have the range indicated by symbol D of FIG. 12 satisfying $23<x<34$, $34<y<58$, and $8<z<43$. Accordingly, the cycle durability is improved and also it is possible to obtain the discharge capacity retention rate of more than 65% at the $100^{th}$ cycle as shown in Table 2.

Figure 13:
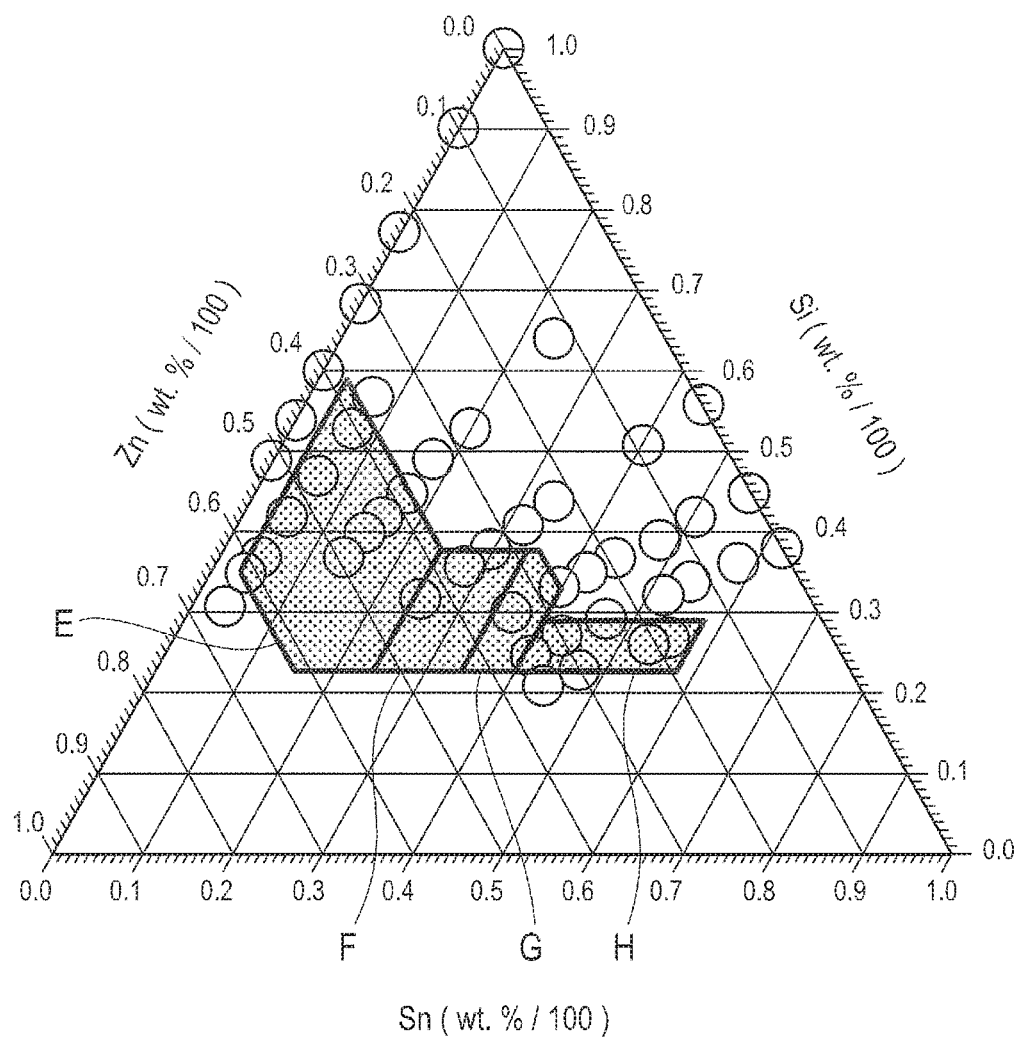
FIG. 13 is a ternary compositional diagram illustrating particularly preferred compositional range of Si—Sn—Zn based alloy constituting the negative electrode active material for an electric device of the present invention.

Furthermore, it is preferable to have the range indicated by symbol E of FIG. 13 satisfying $23<x<58$, $4<y<24$, and, $38<z<61$, the range indicated by symbol F of FIG. 13 satisfying $23<x<38$, $24y<35$, and $27<z<53$, the range indicated by symbol G of FIG. 13 satisfying $23<x<38$, $35<y<40$, and $27<z<44$, or the range indicated by symbol H of FIG. 13 satisfying $23<x<29$, $40 \leq y<58$, and $13<z<37$. Accordingly, the cycle durability is improved and also it is possible to obtain the discharge capacity retention rate of more than 75% at the $100^{th}$ cycle as shown in Table 2.

Meanwhile, as explained above, A is impurities (unavoidable impurities) originating from a raw material or a production method other than the aforementioned three components. Regarding the a, it is $0 \leq a < 0.5$, and more preferably $0 \leq a < 0.1$.

[Si Alloy Represented by $Si_xSn_yC_zA_a$]

By selecting Sn and C as a first added element and a second added element, respectively, $Si_xSn_yC_zA_a$ can have improved cycle life based on suppressed amorphous-crystal phase transition at the time of Li alloying as described above. Accordingly, compared to a negative electrode active material of a prior art, e.g., a carbon negative electrode active material, it can have higher capacity.

Regarding the aforementioned alloy composition, it is preferable that x is 29 or more. Meanwhile, this numerical value range corresponds to the range which is indicated by symbol A in FIG. 17. By having this composition, not only the high capacity is exhibited but also high discharge capacity can be maintained even after 50 cycles or 100 cycles.

Meanwhile, from the viewpoint of having further improvement of the above characteristics of the negative electrode active material, it is preferable that x is in the range of 29 or more and 63 or less, y is in the range of 14 or more and 48 or less, and z is in the range of 11 or more and 48 or less. Meanwhile, this numerical value range corresponds to the range which is indicated by symbol B in FIG. 18.

Figure 19:
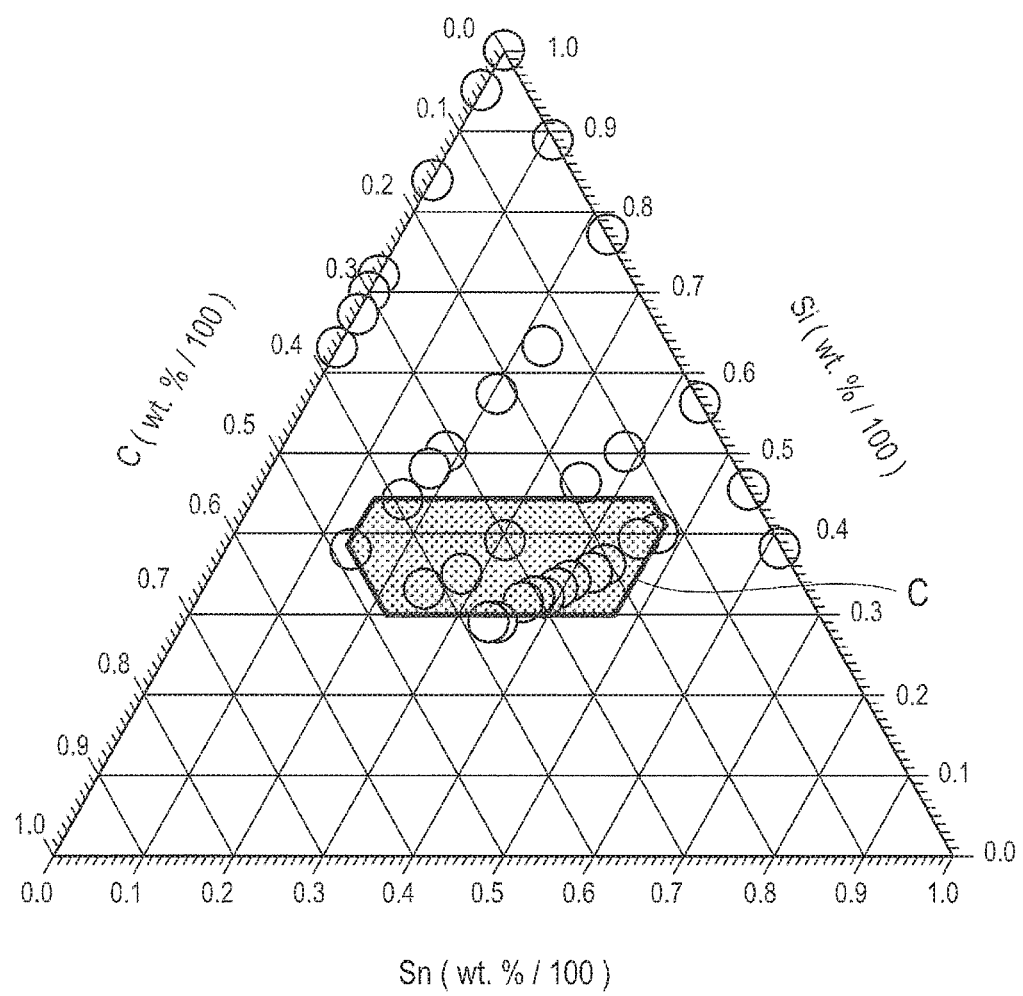
FIG. 19 is a ternary compositional diagram illustrating even more preferred compositional range of Si—Sn—C based alloy constituting the negative electrode active material for an electric device of the present invention.

Furthermore, from the viewpoint of securing more favorable cycle durability, it is preferable that x is in the range of 29 or more and 44 or less, y is in the range of 14 or more and 48 or less, and z is in the range of 11 or more and 48 or less. Meanwhile, this numerical value range corresponds to the range which is indicated by symbol C in FIG. 19.

Figure 20:
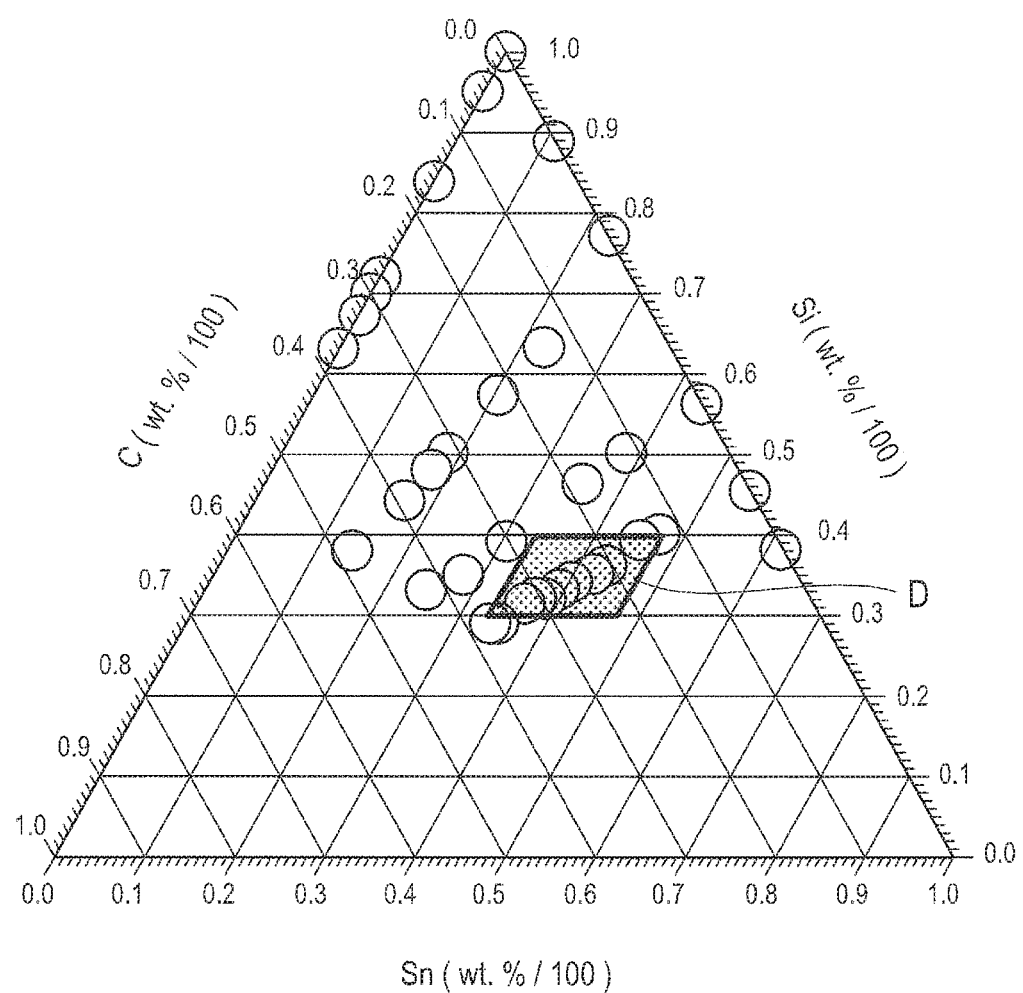
FIG. 20 is a ternary compositional diagram illustrating particularly preferred compositional range of Si—Sn—C based alloy constituting the negative electrode active material for an electric device of the present invention.

Furthermore, it is preferable that x is in the range of 29 or more and 40 or less and y is in the range of 34 or more and 48 or less (thus, $12 \leq z \leq 37$). Meanwhile, this numerical value range corresponds to the range which is indicated by symbol D in FIG. 20.

Meanwhile, as explained above, A is impurities (unavoidable impurities) originating from a raw material or a production method other than the aforementioned three components. Regarding the a, it is $0 \leq a < 0.5$, and preferably $0 \leq a < 0.1$.

(X Ray Diffraction of Si Alloy)

The Si alloy according to the present invention is characterized in that the half width (FWHM: full width at half maximum) (hereinbelow, also simply referred to as a half width) of a diffraction peak of the (111) surface of Si in the range of 2θ=24 to 33° by X ray diffraction measurement of the alloy using CuKα ray is 0.7° or more. An electric device like a lithium ion secondary battery in which the negative electrode active material containing Si alloy with this characteristics is used has high cycle durability.

Although the detailed reason for having improved cycle durability by an electric device using Si alloy with the above characteristics remains unclear, the following reason can be considered.

If a Si alloy having high crystallinity with the half width of less than 0.7° is used, Li is inserted to an active material along with the Si—Si bond cleavage at charge operation. Accordingly, the crystal structure of an active material is disrupted and a large expansion is caused. Thus, it is believed that, as a result of micronization of the Si alloy negative electrode active material itself or disruption of the electron conducting network in a negative electrode active material layer, the cycle durability is significantly lowered.

On the other hand, if a Si alloy with the half width of 0.7° or more is used as an active material, it is believed that, as the Si—Si bond distance in the Si alloy is longer than that of Si crystal due to amorphization and alloying of Six the gap between Si atoms is increased. Accordingly, Li can be inserted to a gap between Si atoms of an active material without the Si—Si bond cleavage at charge operation and the disruption of a micro structure (amorphous structure) of an active material associated with the Li insertion is suppressed. Thus, it is believed that, as the insertion and desorption of Li can be achieved in amorphous Si alloy while Si alloy is maintaining the micro structure (amorphous structure), the cycle durability is improved.

Meanwhile, the above mechanism is based on a pure presumption, and the present invention is not at all limited to the mechanism.

If the Si alloy of the present invention has the half width of less than 0.7°, the cycle durability is lowered. The half width is preferably 1.1° or more, and more preferably 1.4° or more. Meanwhile, the upper limit of the half width would be generally less than 9°. However, from the viewpoint of increasing the mass productivity or the like by shortening of alloying time, it is preferably 8.0° or less, and more preferably 5.0° or less.

In the present invention, as for the half width, a value measured and calculated according to the following method is used.

<Conditions for X Ray Diffraction Measurement>
Apparatus: X ray diffractometer manufactured by Rigaku Corporation (SmartLab9 kW)
Voltage and current: 45 kV-200 mA
X ray wavelength: CuKα 1

From the obtained X ray diffraction spectrum, the half width (FWHM) is obtained according to the method shown in the following 1. to 6. (see, FIG. 24).

1. In the result of X ray diffraction (XRD), the point at which the vertical line at 2θ of 24° and X ray diffraction pattern cross each other is taken as A. Furthermore, the point at which the vertical line at 2θ of 33° and X ray diffraction pattern cross each other is taken as B;
2. The above A and B are connected to each other via a straight line (herein, this line is referred to as a base line);
3. The point at which the vertical line at the diffraction peak (about of 28.5°) of the 111 surface of Si and the above base line cross each other is taken as C;
4. The line connecting the top point of the diffraction peak of the 111 surface of Si to the C is cut in half (the center point after cut in half is taken as D);
5. A parallel line passing through the D is drawn; and
6. The distance between two points at which the parallel line and the X ray diffraction pattern cross each other is determined as half width (FWHM).

The method for controlling the half width at 0.7° or more is not particularly limited. However, there can be a controlling method based on suitable selection of an apparatus used for alloying treatment of each raw material for an alloy and time for alloying treatment.

Specific examples of the device which can be used for an alloying treatment include a planetary ball mill and a stirring ball mill. The time for an alloying treatment cannot be said generally, because it may vary depending on the device to be used. However, in the case of using a planetary ball mill, it would be generally 12 hours or more, preferably 20 hours or more, and more preferably 40 hours or more at rotation number of 600 rpm.

If necessary, a pulverization treatment may be performed after an alloying treatment. If a pulverization treatment is performed after an alloying treatment, the pulverization condition is not particularly limited. However, the pulverization can be generally carried out for 5 minutes to 100 hours, preferably 30 minutes to 4 hours at rate of 400 to 800 rpm.

(Average Particle Diameter of Si Alloy)

It is sufficient that an average particle diameter of Si alloy is at the same level as the known average particle diameter of a negative electrode active material which is contained in the negative electrode active material layer 13, and it is not particularly limited. From the viewpoint of having high output, it is preferably in the range of 1 to 20 μm. However, it is never limited to this range, and it is needless to say that it can be outside of the above range as long as the working effect of this embodiment can be effectively exhibited. Meanwhile, the shape of Si alloy is not particularly limited, and examples include a spherical shape, an elliptical shape, a column shape, a prism shape, a flake shape, and an amorphous shape.

Method for Producing Alloy

The method for producing an alloy with compositional formula $Si_xSn_yM_zA_a$ according to this embodiment is not particularly limited, and the alloy can be produced according to various production methods of a prior art. Namely, as there is almost no difference in state and properties of an alloy which is caused by the production method, any production method would be applicable.

Specifically, examples of the method for producing particle form of an alloy with compositional formula of $Si_xSn_yM_zA_a$ include a solid phase method, a liquid phase method, and a gas phase method. A mechanical alloy method, an arc plasma melt method, or the like can be used, for example.

According to the production method allowing production in particle form, a slurry is prepared by adding a binder, a conductive aid, and a solvent for adjusting viscosity to the particles and a slurry electrode can be formed by using the slurry. For such reasons, it is excellent in that the mass production (production with a large amount) can be achieved and easy commercialization into a battery electrode for actual application can be achieved.

In the above, explanations are given for a certain alloy which is essentially contained in a negative electrode active material layer. However, a negative electrode active material layer may also contain other negative electrode active material. Examples of the negative electrode active material other than the certain alloy described above include carbon like natural graphite, artificial graphite, carbon black, activated carbon, carbon fiber, cokes, soft carbon and hard carbon, pure metal like Si and Sn, an alloy based active material having compositional ratio different from the above-defined ratio, a metal oxide like TiO, $Ti_2O_3$, $TiO_2$, $SiO_2$, SiO, and $SnO_2$, a composite oxide of lithium and transition metal like $Li_{4/3}Ti_{5/3}O_4$ and $Li_7MnN$, Li—Pb based alloy, Li—Al based alloy, Li, or the like. However, from the viewpoint of fully exhibiting the working effect that is obtained by using the certain alloy as a negative electrode active material, the content of the certain alloy in the total amount of 100% by mass of a negative electrode active material is preferably 50 to 100% by mass, more preferably 80 to 100% by mass, even more preferably 90 to 100% by mass, particularly preferably 95 to 100% by mass, and most preferably 100% by mass.

The negative electrode active material layer 13 also contains a binder.

(Binder)

The binder is added for the purpose of binding active materials or binding between active material and current collector so as to maintain the electrode structure. The type of a binder used for a negative electrode active material layer is not particularly limited, and those described above for the positive electrode active material layer can be also used as a binder for a negative electrode active material layer. As such, further explanations are omitted herein.

Meanwhile, the amount of the binder contained in the negative electrode active material layer is not particularly limited as long as the binder can bind an active material. However, the amount of binder is preferably 0.5 to 20% by mass, and more preferably 1 to 15% by mass relative to the negative electrode active material layer.

(Requirements Common to Positive Electrode Active Material Layer 15 and Negative Electrode Active Material Layer 13)

Hereinbelow, the requirements that are common to the positive electrode active material layer 15 and the negative electrode active material layer 13 will be explained.

The positive electrode active material layer 15 and negative electrode active material layer 13 contain, if necessary, a conductive aid, an electrolyte salt (lithium salt), an ion conductive polymer, or the like. In particular, the negative electrode active material layer 13 essentially contains a conductive aid.

Conductive Aid

The conductive aid is an additive to be mixed for improving conductivity of positive electrode active material layer or negative electrode active material layer. Examples of the conductive aid include carbon black like acetylene black, graphite, and carbon materials such as vapor-grown carbon fiber, or the like. If the active material layer contains a conductive aid, the electron network in the inside of the active material layer is effectively formed. Therefore, it would contribute to the improvement of output characteristics of a battery.

The content of the conductive aid to be contained in an active material layer is in the range of 1% by mass or more, more preferably 3% by mass or more, and even more preferably 5% by mass or more relative to the total amount of an active material layer. Furthermore, the content of the conductive aid to be contained in an active material layer is in the range of 15% by mass or less, more preferably 10% by mass or less, and even more preferably 7% by mass or less relative to the total amount of an active material layer. The active material itself has low electron conducting property, and the electrode resistance can be reduced depending on the amount of a conductive aid. Accordingly, by determining the blending ratio (content) of a conductive aid in an active material layer within the above range, the following effect is exhibited. Namely, without compromising the electrode reaction, the electron conducting property can be fully obtained, the decrease in energy density caused by decreased electrode density can be suppressed, and also the improvement of energy density based on increased electrode density can be achieved.

Furthermore, a conductive binder having both functions of a conductive aid and a binder can be used instead of the conductive aid and binder, and it may be used in combination with one or both of those conductive aid and binder. Examples of the conductive binder include TAB-2 (manufactured by Hohsen Corp.) which is already commercially available.

Electrolyte Salt (Lithium Salt)

Examples of the electrolyte salt (lithium salt) include Li$(C_2F_5SO_2)_2$N, $LiPF_6$, $LiBF_4$, $LiClO_4$, $LiAsF_6$, and $LiCF_3SO_3$.

Ion Conductive Polymer

Examples of the ion conductive polymer include polyethylene oxide (PEO)-based and polypropylene oxide (PPO)-based polymer.

A blending ratio of the components that are contained in a positive electrode active material layer and a negative electrode active material layer is not particularly limited. The blending ratio can be adjusted by suitably referring to the already-known knowledge about a non-aqueous secondary battery.

The thickness of each active material layer (active material layer on a single surface of a current collector) is not particularly limited either, and reference can be made to the already-known knowledge about a battery. For example, the thickness of each active material layer is generally about 1 to 500 µm, and preferably 2 to 100 µm considering the purpose of using the battery (for example, either output or energy is emphasized) and ion conductivity.

<Current Collector>

The current collectors 11 and 12 are constituted with a conductive material, and the size of the current collector can be determined in the light of the use of a battery. For example, when used for a large size battery requiring high energy density, a current collector with large area is used.

The thickness of the current collector is not particularly limited, either. The thickness of a current collector is generally 1 to 100 µm or so.

The shape of the current collector is not particularly limited, either. For the stack type battery 10 shown in FIG. 1, a fishnet shape (for example, expanded grid and the like) or the like can be used in addition to a current collecting foil.

Meanwhile, when a thin film alloy is directly formed on the negative electrode current collector 12 by a sputtering of a negative electrode active material, a current collecting foil is desirably used.

The material for constituting the collector is not particularly limited. For example, it is possible to use a metal, a conductive polymer material or a resin in which a conductive filler has been added to a non-conductive polymer material.

Specifically, examples of the metal include aluminum, nickel, iron, stainless steel, titanium, and copper. Besides these, it is possible to preferably use a cladding material of nickel and aluminum, a cladding material of copper and aluminum, a plating material made of a combination of these metals, and the like. It may be a foil prepared by covering the metal surface with aluminum. In particular, from the viewpoint of electron conductivity, battery operation potential, and adhesiveness of a negative electrode active material on a current collector by sputtering, aluminum, stainless steel, copper, and nickel are preferable.

Furthermore, examples of the conductive polymer material include polyaniline, polypyrrole, polythiophene, polyacetylene, polyparaphenylene, polyphenylene vinylene, polyacrylonitrile, and polyoxadiazole. Those conductive polymer materials are advantageous in terms of simplifying the production process or having light weight of a current collector, because they have sufficient conductivity even without having a conductive filler added.

Examples of the non-conductive polymer material include polyethylene (PE; high density polyethylene (HDPE), low density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS) and the like. Such non-conductive polymer material can have a superior potential resistance or solvent resistance.

If necessary, it is possible to add the conductive filler to the above-mentioned conductive polymer material or non-conductive polymer material. In particular, in a case where a resin as a base member of a current collector is made of only the non-conductive polymer, a conductive filler becomes inevitably essential to provide the resin with conductivity.

The conductive filler can be used without a particular limitation as long as it is a material having conductivity. For example, as a material superior in conductivity, potential resistance, or lithium ion shielding property, it is possible to mention metals, conductive carbons, and the like. Although the metal is not particularly limited, it is preferable to contain at least one metal selected from the group consisting of Ni, Ti, Al, Cu, Pt, Fe, Cr, Sn, Zn, In, Sb, and K, or an alloy or metal oxide containing these metals. Furthermore, although the conductive carbon is not particularly limited, it is preferable to contain at least one selected from the group consisting of acetylene black, Vulcan, black pearl, carbon nanofiber, ketjen black, carbon nanotube, carbon nanohorn, carbon nanoballoon, and fullerene.

The amount of the conductive filler to be added is not particularly limited as long as it is the amount capable of providing a current collector with a sufficient conductivity. In general, it is 5 to 35% by mass or so.

<Electrolyte Layer>

As an electrolyte for constituting the electrolyte layer 17, a liquid electrolyte or a polymer electrolyte can be used.

The liquid electrolyte has a form in which a lithium salt (electrolyte salt) is dissolved in an organic solvent. Examples of the organic solvent which can be used include carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and methyl propyl carbonate (MPC).

Furthermore, as a lithium salt, the compound which can be added to an active material layer of an electrode such as Li $(CF_3SO_2)_2N$, Li $(C_2F_5SO_2)_2N$, $LiPF_6$, $LiBF_4$, $LiAsF_6$, $LiTaF_6$, $LiClO_4$, and $LiCF_3SO_3$ can be used.

Meanwhile, the polymer electrolyte is classified into a gel electrolyte containing electrolyte solution and a pure polymer electrolyte not containing any electrolyte solution.

The gel electrolyte has a constitution in which the above-mentioned liquid electrolyte (electrolyte solution) has been injected into a matrix polymer composed of an ion conductive polymer. Use of a gel polymer electrolyte as an electrolyte is excellent in that the fluidity of an electrolyte disappears and the ion conducting property between each layer is easily blocked.

Examples of the ion conductive polymer which is used as a matrix polymer include polyethylene oxide (PEO), polypropylene oxide (PPO), and a copolymer thereof. An electrolyte salt such as lithium salt can be dissolved well in those polyalkylene oxide-based polymers.

The ratio of the liquid electrolyte (electrolyte solution) in gel electrolyte is, although not particularly limited, preferably several % by mass to 98% by mass or so from the viewpoint of ion conductivity or the like. In this embodiment, it is particularly effective for a gel electrolyte with high content of electrolyte liquid like electrolyte liquid ratio of 70% by mass or more.

Meanwhile, when the electrolyte layer is composed of a liquid electrolyte, a gel electrolyte, or a pure polymer electrolyte, it is also possible to use a separator in an electrolyte layer. Specific examples of a separator (including non-woven fabric) shape include a microporous film or a porous plate composed of polyolefin like polyethylene and polypropylene, and also non-woven fabric.

The pure polymer electrolyte has a constitution in which a supporting salt (lithium salt) is dissolved in the matrix polymer without containing an organic solvent as a plasticizer. As such, when the electrolyte layer is composed of a pure polymer electrolyte, there is no problem of having liquid leakage from a battery so that the battery reliability can be improved.

By forming of a cross-linked structure, the matrix polymer of a gel electrolyte or pure polymer electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, with the use of a suitable polymerization initiator.

<Current Collecting Plate and Lead>

For the purpose of drawing electric current to outside of a battery, it is possible to use a current collecting plate. A current collecting plate is electrically connected to a current collector or a lead, and exposed outside a laminate sheet as a battery outer casing.

The material for forming the current collecting plate is not particularly limited, and a known highly conductive material which has been conventionally used for a current collecting plate of a lithium ion secondary battery can be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are preferable. Meanwhile, the same material or a different material can be used for a positive electrode current collecting plate and a negative electrode current collecting plate.

If necessary, it is also possible to use a positive electrode terminal lead or a negative electrode terminal lead. The same material used for a terminal lead of a lithium ion secondary battery of a prior art can be also used as a material for forming a positive electrode terminal lead and a negative electrode terminal lead. Meanwhile, a portion led out from the battery outer casing 29 is preferably coated with a heat resistant and insulating thermally shrunken tube or the like so that it has no influence on a product (for example, an automobile component, in particular, an electronic device or the like) according to electric leak after contact with neighboring instruments or wirings.

<Battery Outer Casing>

As for the battery outer casing 29, not only a known metal can case can be used, but also an envelope-shaped casing or the like for covering the power generating element and using a laminate film including aluminum can be used. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable.

Meanwhile, the lithium ion secondary battery described above can be fabricated according to a conventionally known production method.

<External Configuration of Lithium Ion Secondary Battery>

Figure 2:
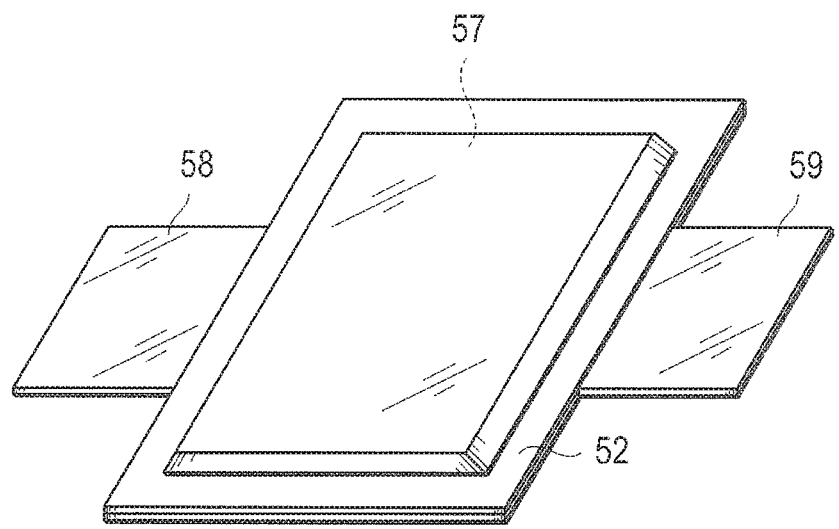
FIG. 2 is a perspective view schematically illustrating the outer appearance of the stacked flat type lithium ion secondary battery as one representative embodiment of the electric device of the present invention.

FIG. 2 is a perspective view schematically illustrating the outer appearance of a flat stack type lithium ion secondary battery.

As shown in FIG. 2, the flat stack type lithium ion secondary battery 50 has a flat and rectangular shape, and the positive electrode current collecting plate 59 and the negative electrode current collecting plate 58 are drawn from both sides of the battery to the outside. The power generating element 57 is covered by the battery outer casing 52 of the lithium ion secondary battery 50 and the periphery of the element is fused by heat. The power generating element 57 is sealed in a state in which the positive electrode current collecting plate 59 and the negative electrode current collecting plate 58 are drawn to the outside. Herein, the power generating element 57 corresponds to the power generating element 21 of the lithium ion secondary battery (stack type battery) 10 shown in FIG. 1. The power generating element 57 is obtained by stacking of plural single battery layer (singe cell) 19 composed of the positive electrode (positive electrode active material layer) 13, the electrolyte layer 17, and the negative electrode (negative electrode active material layer) 15.

Meanwhile, the lithium ion secondary battery is not limited to the above flat stack type shape (laminate cell). As for the wound type lithium ion battery, it can be a cell with tubular shape (coin cell) or a prism shape (prism cell), a flat rectangular cell obtained by modifying a cell with tubular shape, or a cylinder shape cell, and thus it is not particularly limited. In a cell with tubular shape or prism shape, a laminate film may be used as an outer casing material, and it is also possible to use a conventionally known tubular can (metal can), and thus it is not particularly limited. Preferably, the power generating element is covered with a laminate film. According to this shape, it is possible to have light weight.

Furthermore, extraction of the positive electrode current collecting plate 59 and the negative electrode current collecting plate 58 shown in FIG. 2 is not particularly limited, either. That is, the positive electrode current collecting plate 59 and the negative electrode current collecting plate 58 can be extracted from the same side, or each of the positive electrode current collecting plate 59 and the negative electrode current collecting plate 58 is divided into several groups and extracted from each side, and thus it is not limited to the form shown in FIG. 2. Furthermore, as for the wound type lithium ion battery, a terminal may be formed by using a tubular can (metal can), for example, instead of a current collecting plate.

As described above, the negative electrode obtained by using a negative electrode active material for a lithium ion secondary battery of this embodiment and the lithium ion secondary battery of this embodiment can be preferably used as a high-capacity power source for an electric vehicle, a hybrid electric vehicle, a fuel cell electric vehicle, or a hybrid fuel cell electric vehicle. Namely, they can be preferably used as a power source or an auxiliary power source for driving a vehicle in which high volume energy density and high volume output density are required.

Meanwhile, although a lithium ion battery has been exemplified as an electric device in the above embodiment, it is not limited thereto, and it can be applied to other types of secondary battery or even to a primary battery. It can be also applied to a capacitor as well as a battery.

EXAMPLES

Hereinbelow, a description is given in more detail in view of Examples, but the technical scope of the present invention is not limited to the Examples given below.

First, as a reference example, performance evaluation was performed for the Si alloy represented by the chemical formula (1) which constitutes the negative electrode active material for an electric device of the present invention.

(Reference Example A): Performance Evaluation of $Si_xSn_yTi_zA_a$

[1] Production of Negative Electrode

As a sputtering device, a ternary DC magnetron sputtering device of independent control type (combinatorial sputter coating device manufactured by Yamato Kiki Co., Ltd., distance between gun and sample: about 100 mm) was used, and according to the following conditions, a thin film of negative electrode active material alloy having each composition was formed on a substrate (current collector) composed of a nickel foil with thickness of 20 μm. As a result, 40 types of negative electrode samples in total were obtained (Reference Examples 1-1 to 1-26 and Reference Examples 1'-1 to 1'-14).

(1) Target (Manufactured by Kojundo Chemical Lab. Co., Ltd., Purity: 4 N)

Si: 50.8 mm diameter, 3 mm thickness (adhered with oxygen-free copper backing plate having thickness of 2 mm)

Sn: 50.8 mm diameter, 5 mm thickness

Ti: 50.8 mm diameter, 5 mm thickness.

(2) Conditions for Film Forming

Base pressure: ~7×10$^{-6}$ Pa

Gas type for sputtering: Ar (99.9999% or more)

Injection amount of gas for sputtering: 10 sccm

Sputtering pressure: 30 mTorr

DC power source: Si (185 W), Sn (0 to 40 W), Ti (0 to 150 W)

Time for pre-sputtering: 1 min.

Time for sputtering: 10 min.

Substrate temperature: room temperature (25° C.).

Namely, by using the above Si target, Sn target, and Ti target, fixing the sputtering time at 10 minutes, and modifying the power of DC power source within the above range, an alloy thin film in amorphous state was formed on a Ni substrate to obtain negative electrode samples having an alloy thin film with different composition.

Meanwhile, various examples for producing a sample for above (2) are as follows. For Reference Example 1-17, DC power source 1 (Si target): 185 W, DC power source 2 (Sn target): 30 W, DC power source 3 (Ti target): 150 W. For Reference Example 1'-2, DC power source 1 (Si target): 185 W, DC power source 2 (Sn target): 22 W, DC power source 3 (Ti target): 0 W. For Reference Example 1'-7, DC power source 1 (Si target): 185 W, DC power source 2 (Sn target): 0 W, DC power source 3 (Ti target): 30 W.

Component composition of those alloy thin films is described in Table 1 and FIG. 3.

(3) Method for Analysis

Analysis of composition: SEM.EDX analysis (JEOL, Ltd.), EPMA analysis (JEOL, Ltd.)

Measurement of film thickness (for calculation of sputtering rate): Instrument for measuring film thickness (Tokyo Instruments, Inc.)

Analysis of film state: Raman spectrophotometric measurement (Bruker Corporation).

[2] Fabrication of Battery

Each negative electrode sample obtained from above and a counter electrode composed of a lithium foil (manufactured by Honjo Metal Co., Ltd., diameter 15 mm, thickness 200 μm) was placed via a separator (Celgard 2400 manufactured by Celgard, LLC.) followed by injection of an electrolyte solution to fabricate a CR2032 type coin cell, respectively.

Meanwhile, as for the aforementioned electrolyte solution, a solution having $LiPF_6$ (lithium hexafluorophosphate) dissolved at 1 M concentration in a non-aqueous mixture solvent of ethylene carbonate (EC) and diethyl carbonate (DEC) mixed at volume ratio of 1:1 was used.

[3] Charge and Discharge Test of Battery

The following charge and discharge test was carried out for each battery obtained from above.

Namely, by using a charge and discharge tester (HJ0501SM8A manufactured by HOKUTO DENKO CORP.), a charging process (process of Li insertion to the negative electrode as a subject for an evaluation) was performed from 2 V to 10 mV at 0.1 mA according to a constant current and constant voltage mode in an incubator (PFU-3K manufactured by ESPEC Corp.) set at the temperature of 300 K (27° C.). After that, as a discharging process (process of Li desorption from the negative electrode), discharge was performed from 10 mV to 2 V at 0.1 mA according to a constant current mode. By having this charge and discharge cycle as a one cycle, 100 cycles were repeated.

In addition, the discharge capacities at the $50^{th}$ cycle and the $100^{th}$ cycle were obtained, and the retention rates relative to the discharge capacity at the first cycle were calculated. The results are shown in Table 1. The discharge capacity indicates the value which is calculated per weight of an alloy. Meanwhile, the "discharge capacity (mAh/g)" represents the value per weight of pure Si or alloy, and it indicates the capacity when Li reacts with Si—Sn-M alloy (Si-M alloy, pure Si or Si—Sn alloy). Meanwhile, as described herein, the expression "initial capacity" corresponds to the "discharge capacity (mAh/g)" at initial cycle (first cycle).

Furthermore, the "discharge capacity retention rate (%)" at the $50^{th}$ cycle or the $100^{th}$ cycle is an indicator expressing the amount of remaining capacity compared to the initial capacity. The formula for calculating the discharge capacity retention rate (%) is described below.

Discharge capacity retention rate (%)=Discharge capacity at the 50th cycle or the 100th cycle/ Discharge capacity at the first cycle×100      [Mathematical formula 5]

Figure 7:
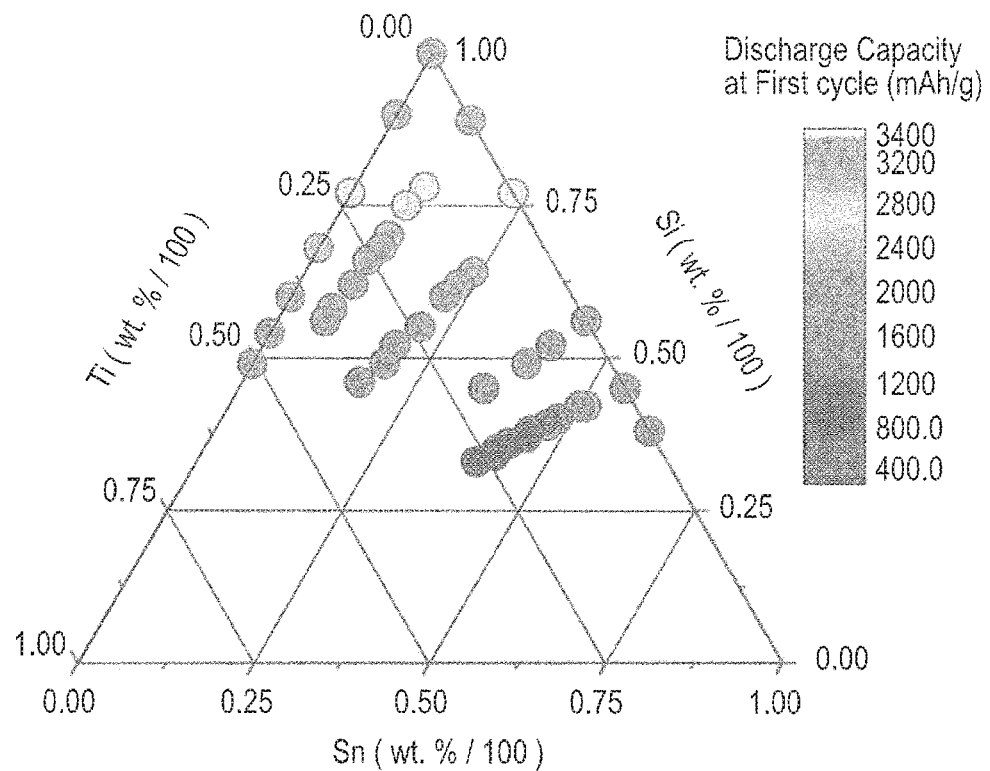
FIG. 7 is a drawing illustrating the influence of the composition of a negative electrode active material alloy on initial discharge capacity of the battery obtained in Reference Example A.
Figure 8:
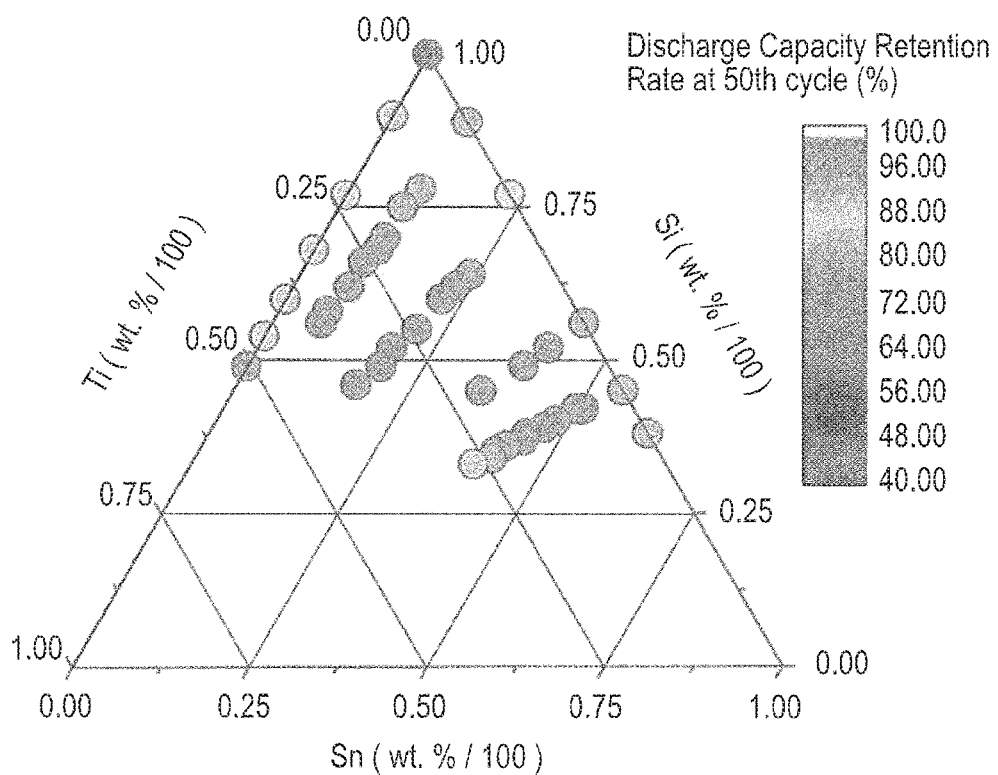
FIG. 8 is a drawing illustrating the influence of the composition of a negative electrode active material alloy on discharge capacity retention rate at the 50$^{th}$ cycle of the battery obtained in Reference Example A.
Figure 9:
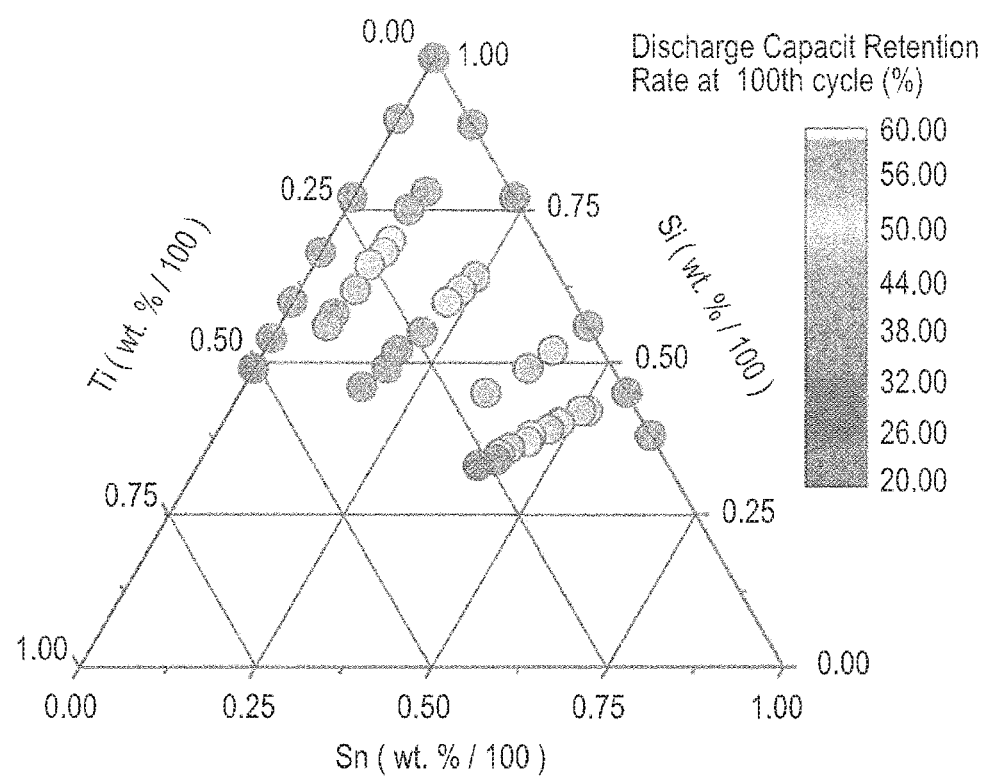
FIG. 9 is a drawing illustrating the influence of the composition of a negative electrode active material alloy on discharge capacity retention rate at the 100$^{th}$ cycle of the battery obtained in Reference Example A.

The results are shown in Table 1. Furthermore, relationship between the discharge capacity at the first cycle and alloy composition is shown in FIG. 7. Furthermore, relationship between the discharge capacity retention rate at the $50^{th}$ cycle and $100^{th}$ cycle and alloy composition is shown in FIG. 8 and FIG. 9, respectively. Meanwhile, the discharge capacity represents the value which has been calculated per weight of the alloy.

TABLE 1

| | Composition (% by mass) | | | At the first cycle Discharge capacity | At the $50^{th}$ cycle Discharge capacity | At the $100^{th}$ cycle Discharge capacity |
|---|---|---|---|---|---|---|
| | Si | Sn | Ti | (mAh/g) | retention rate(%) | retention rate(%) |
| Reference Example 1-1 | 52 | 41 | 7 | 1764 | 94 | 51 |
| Reference Example 1-2 | 49 | 39 | 12 | 1635 | 95 | 53 |
| Reference Example 1-3 | 45 | 35 | 20 | 1375 | 94 | 53 |
| Reference Example 1-4 | 42 | 51 | 7 | 1319 | 98 | 52 |
| Reference Example 1-5 | 42 | 50 | 8 | 1307 | 94 | 52 |
| Reference Example 1-6 | 40 | 48 | 12 | 1217 | 94 | 51 |
| Reference Example 1-7 | 39 | 47 | 14 | 1175 | 94 | 51 |
| Reference Example 1-8 | 38 | 45 | 17 | 1108 | 94 | 49 |
| Reference Example 1-9 | 37 | 45 | 18 | 1089 | 94 | 48 |
| Reference Example 1-10 | 36 | 43 | 21 | 1050 | 93 | 47 |
| Reference Example 1-11 | 35 | 42 | 23 | 1008 | 93 | 47 |
| Reference Example 1-12 | 64 | 24 | 12 | 2277 | 93 | 46 |
| Reference Example 1-13 | 62 | 23 | 15 | 2173 | 94 | 47 |
| Reference Example 1-14 | 60 | 22 | 18 | 1978 | 94 | 50 |

TABLE 1-continued

| | Composition (% by mass) | | | At the first cycle Discharge capacity | At the 50th cycle Discharge capacity | At the 100th cycle Discharge capacity |
|---|---|---|---|---|---|---|
| | Si | Sn | Ti | (mAh/g) | retention rate(%) | retention rate(%) |
| Reference Example 1-15 | 55 | 21 | 24 | 1818 | 97 | 55 |
| Reference Example 1-16 | 52 | 19 | 29 | 1661 | 98 | 58 |
| Reference Example 1-17 | 49 | 19 | 32 | 1538 | 98 | 59 |
| Reference Example 1-18 | 46 | 17 | 37 | 1371 | 96 | 58 |
| Reference Example 1-19 | 78 | 10 | 12 | 2669 | 91 | 43 |
| Reference Example 1-20 | 75 | 9 | 16 | 2531 | 91 | 43 |
| Reference Example 1-21 | 70 | 9 | 21 | 2294 | 94 | 49 |
| Reference Example 1-22 | 68 | 9 | 23 | 2194 | 94 | 50 |
| Reference Example 1-23 | 66 | 8 | 26 | 2073 | 95 | 51 |
| Reference Example 1-24 | 62 | 8 | 30 | 1878 | 95 | 53 |
| Reference Example 1-25 | 58 | 7 | 35 | 1775 | 95 | 56 |
| Reference Example 1-26 | 56 | 7 | 37 | 1632 | 96 | 55 |
| Reference Example 1'-1 | 100 | 0 | 0 | 3232 | 47 | 22 |
| Reference Example 1'-2 | 89 | 11 | 0 | 3149 | 78 | 36 |
| Reference Example 1'-3 | 77 | 23 | 0 | 2622 | 84 | 38 |
| Reference Example 1'-4 | 56 | 44 | 0 | 1817 | 91 | 42 |
| Reference Example 1'-5 | 45 | 55 | 0 | 1492 | 91 | 42 |
| Reference Example 1'-6 | 38 | 62 | 0 | 1325 | 91 | 42 |
| Reference Example 1'-7 | 90 | 0 | 10 | 3218 | 82 | 36 |
| Reference Example 1'-8 | 77 | 0 | 23 | 2685 | 82 | 39 |
| Reference Example 1'-9 | 68 | 0 | 32 | 2398 | 82 | 39 |
| Reference Example 1'-10 | 60 | 0 | 40 | 2041 | 83 | 37 |
| Reference Example 1'-11 | 54 | 0 | 46 | 1784 | 83 | 32 |
| Reference Example 1'-12 | 49 | 0 | 51 | 1703 | 75 | 24 |
| Reference Example 1'-13 | 34 | 42 | 24 | 977 | 90 | 38 |
| Reference Example 1'-14 | 33 | 40 | 27 | 870 | 82 | 23 |

Based on the results above, as to the battery of Reference Example A (see, Table 1) in which Si—Sn—Ti based alloy having each component within a specific range, that is, the range A or the range B shown in FIG. 3, is used as negative electrode active material, the initial capacity exceeds at least 1000 mAh/g as shown in FIG. 7. Furthermore, as shown in FIG. 8 and FIG. 9, it was confirmed that the discharge capacity retention rate was 91% or more after 50 cycles and was 43% or more even after 100 cycles.

(Reference Example B): Performance Evaluation of $Si_xSn_yZn_zA_a$

[1] Production of Negative Electrode

"Ti: 50.8 mm diameter, 5 mm thickness" of the target in the (1) of Reference Example A was changed to "Zn: 50.8 mm diameter, 3 mm thickness". In addition, "Ti (0 to 150 W)" of the DC power source in the (2) was changed to "Zn (0 to 150 W)". Except those changes, 46 types of negative electrode samples in total were produced in the same manner as Reference Example A (Reference Examples 2-1 to 2-32 and Reference Examples 2'-1 to 2'-14).

Namely, by using the above Si target, Sn target, and Zn target, fixing the sputtering time at 10 minutes, and modifying the power of DC power source within the above range, an alloy thin film in amorphous state was formed on a Ni substrate. As a result, negative electrode samples having an alloy thin film with different composition were obtained.

Meanwhile, various examples for producing a sample for the DC power source in the (2) are as follows. For Reference Example 2-4, DC power source 1 (Si target) 185 W, DC power source 2 (Sn target) 22 W, DC power source 3 (Zn target) 100 W. Furthermore, for Reference Example 2'-2, DC power source 1 (Si target) 185 W, DC power source 2 (Sn target) 30 W, DC power source 3 (Zn target) 0 W. Furthermore, for Reference Example 2'-5, DC power source 1 (Si target) 185 W, DC power source 2 (Sn target) 0 W, DC power source 3 (Zn target) 25 W.

Component composition of those alloy thin films is described in Table 2. Meanwhile, the analysis of the obtained alloy thin film was performed by using the same analysis method and analysis instrument as those of Reference Example A.

[2] Fabrication of Battery

A CR2032 type coin cell was fabricated in the same manner as Reference Example A.

[3] Charge and Discharge Test of Battery

Charge and discharge test of a battery was performed in the same manner as Reference Example A. The results are shown in Table 2.

TABLE 2

| | Composition (% by mass) | | | At the first cycle Discharge capacity | At the 50$^{th}$ cycle Discharge capacity | At the 100$^{th}$ cycle Discharge capacity |
|---|---|---|---|---|---|---|
| | Si | Sn | Zn | (mAh/g) | retention rate(%) | retention rate(%) |
| Reference Example 2-1 | 57 | 7 | 36 | 2457 | 94 | 69 |
| Reference Example 2-2 | 53 | 7 | 40 | 2357 | 100 | 89 |
| Reference Example 2-3 | 47 | 6 | 47 | 2200 | 100 | 98 |
| Reference Example 2-4 | 42 | 5 | 53 | 2121 | 100 | 100 |
| Reference Example 2-5 | 37 | 5 | 58 | 1857 | 96 | 93 |
| Reference Example 2-6 | 35 | 4 | 61 | 1813 | 93 | 61 |
| Reference Example 2-7 | 53 | 20 | 27 | 2022 | 92 | 64 |
| Reference Example 2-8 | 49 | 18 | 33 | 1897 | 93 | 72 |
| Reference Example 2-9 | 45 | 17 | 38 | 1712 | 94 | 72 |
| Reference Example 2-10 | 42 | 16 | 42 | 1659 | 100 | 80 |
| Reference Example 2-11 | 40 | 15 | 45 | 1522 | 100 | 84 |
| Reference Example 2-12 | 37 | 14 | 49 | 1473 | 100 | 92 |
| Reference Example 2-13 | 51 | 40 | 9 | 2031 | 92 | 53 |
| Reference Example 2-14 | 44 | 34 | 22 | 1803 | 92 | 58 |
| Reference Example 2-15 | 41 | 32 | 27 | 1652 | 93 | 60 |
| Reference Example 2-16 | 38 | 30 | 32 | 1547 | 94 | 70 |
| Reference Example 2-17 | 36 | 28 | 36 | 1448 | 100 | 82 |
| Reference Example 2-18 | 32 | 25 | 43 | 1253 | 100 | 84 |
| Reference Example 2-19 | 42 | 50 | 8 | 1626 | 92 | 61 |
| Reference Example 2-20 | 39 | 48 | 13 | 1603 | 92 | 65 |
| Reference Example 2-21 | 37 | 44 | 19 | 1501 | 92 | 68 |
| Reference Example 2-22 | 35 | 42 | 23 | 1431 | 93 | 69 |
| Reference Example 2-23 | 33 | 40 | 27 | 1325 | 92 | 70 |
| Reference Example 2-24 | 30 | 36 | 34 | 1248 | 100 | 83 |
| Reference Example 2-25 | 36 | 58 | 6 | 1522 | 92 | 58 |
| Reference Example 2-26 | 34 | 54 | 12 | 1453 | 95 | 67 |
| Reference Example 2-27 | 32 | 52 | 16 | 1362 | 96 | 72 |
| Reference Example 2-28 | 29 | 47 | 24 | 1249 | 76 | 74 |
| Reference Example 2-29 | 27 | 43 | 30 | 1149 | 94 | 82 |
| Reference Example 2-30 | 25 | 41 | 34 | 1094 | 93 | 87 |

TABLE 2-continued

|  | Composition (% by mass) | | | At the first cycle Discharge capacity | At the 50th cycle Discharge capacity | At the 100th cycle Discharge capacity |
|---|---|---|---|---|---|---|
|  | Si | Sn | Zn | (mAh/g) | retention rate(%) | retention rate(%) |
| Reference Example 2-31 | 27 | 55 | 18 | 1191 | 92 | 78 |
| Reference Example 2-32 | 26 | 53 | 21 | 1142 | 92 | 77 |
| Reference Example 2'-1 | 100 | 0 | 0 | 3232 | 47 | 22 |
| Reference Example 2'-2 | 56 | 44 | 0 | 1817 | 91 | 42 |
| Reference Example 2'-3 | 45 | 55 | 0 | 1492 | 91 | 42 |
| Reference Example 2'-4 | 38 | 62 | 0 | 1325 | 91 | 42 |
| Reference Example 2'-5 | 90 | 0 | 10 | 3218 | 82 | 36 |
| Reference Example 2'-6 | 77 | 0 | 23 | 2685 | 82 | 39 |
| Reference Example 2'-7 | 68 | 0 | 32 | 2398 | 82 | 39 |
| Reference Example 2'-8 | 60 | 0 | 40 | 2041 | 83 | 37 |
| Reference Example 2'-9 | 54 | 0 | 46 | 1784 | 83 | 32 |
| Reference Example 2'-10 | 49 | 0 | 51 | 1703 | 75 | 24 |
| Reference Example 2'-11 | 31 | 4 | 65 | 1603 | 91 | 40 |
| Reference Example 2'-12 | 64 | 24 | 12 | 2478 | 91 | 37 |
| Reference Example 2'-13 | 23 | 47 | 30 | 996 | 72 | 42 |
| Reference Example 2'-14 | 21 | 44 | 35 | 912 | 66 | 31 |

Figure 10:
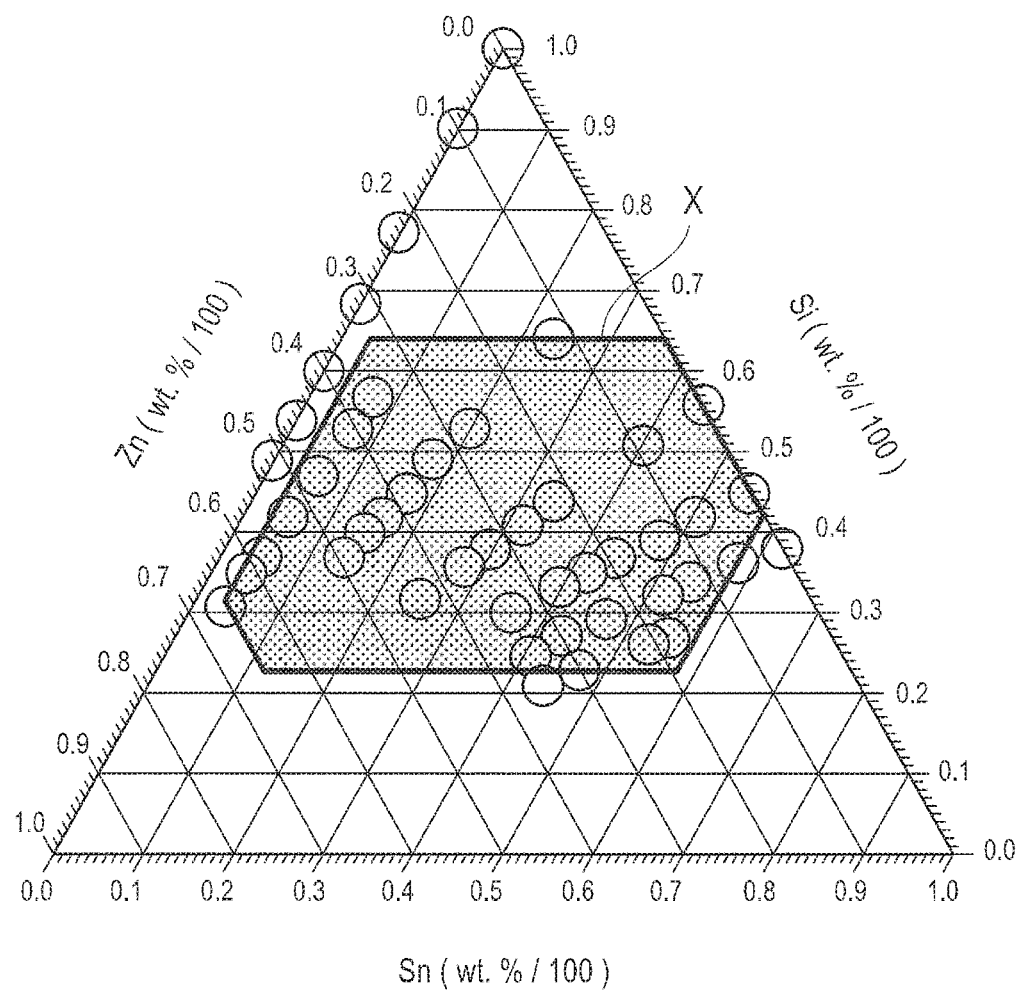
FIG. 10 is a ternary compositional diagram in which the alloy component formed into a film in Reference Example B is plotted, together with the preferred compositional range of Si—Sn—Zn based alloy constituting the negative electrode active material for an electric device of the present invention.
Figure 14:
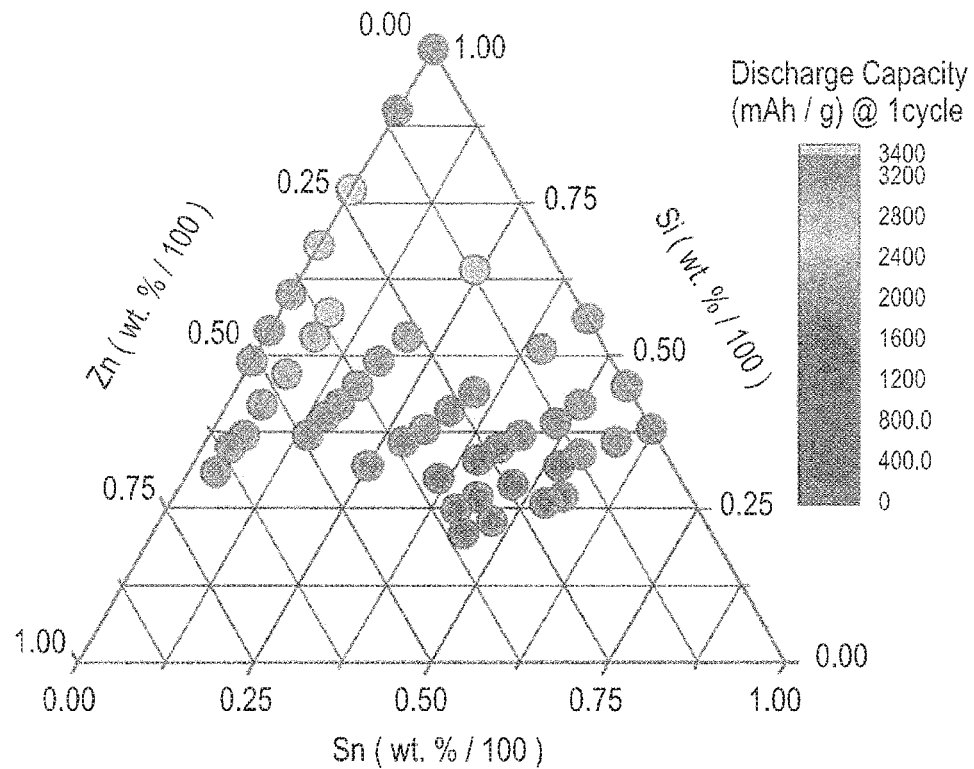
FIG. 14 is a drawing illustrating the influence of the composition of a negative electrode active material alloy on initial discharge capacity of the battery obtained in Reference Example B.
Figure 15:
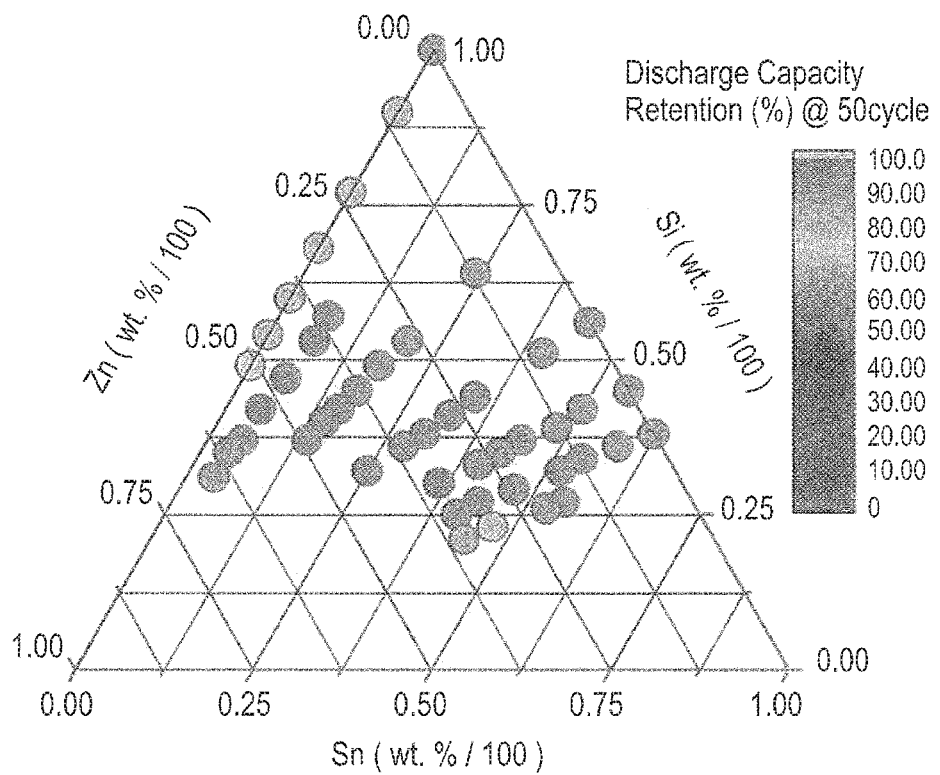
FIG. 15 is a drawing illustrating the influence of the composition of a negative electrode active material alloy on discharge capacity retention rate at the 50$^{th}$ cycle of the battery obtained in Reference Example B.
Figure 16:
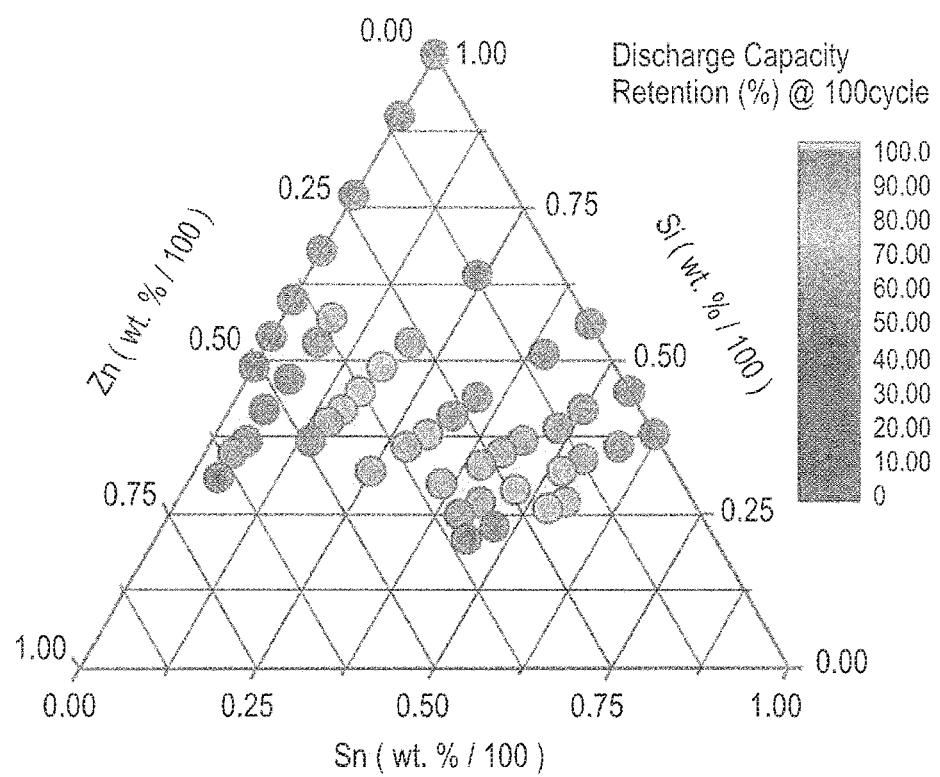
FIG. 16 is a drawing illustrating the influence of the composition of a negative electrode active material alloy on discharge capacity retention rate at the 100$^{th}$ cycle of the battery obtained in Reference Example B.

Based on the results above, the battery of Reference Example B (see, Table 2) in which Si—Sn—Zn based alloy having each component within a specific range, that is, the range X shown in FIG. 10, is used as negative electrode active material, has the initial capacity exceeding at least 1000 mAh/g as shown in FIG. 14. Furthermore, as shown in FIG. 15 and FIG. 16, regarding the negative electrode active material composed of Si—Sn—Zn based alloy within the range X shown in FIG. 10, it was confirmed that the discharge capacity retention rate was 92% or more after 50 cycles and was more than 50% even after 100 cycles (see, Reference Examples 2-1 to 2-32).

(Reference Example C): Performance Evaluation of $Si_xSn_yC_zA_a$

[1] Production of Negative Electrode

"Ti: 50.8 mm diameter, 5 mm thickness" of the target in the (1) of Reference Example A was changed to "C: 50.8 mm diameter, 3 mm thickness" (adhered with oxygen-free copper backing plate having thickness of 2 mm) In addition, "Ti (0 to 150 W)" of the DC power source in the (2) was changed to "C (0 to 150 W)". Except those changes, 34 types of negative electrode samples in total were produced in the same manner as Reference Example A (Reference Examples 3-1 to 3-22 and Reference Examples 3'-1 to 3'-12).

Meanwhile, various examples for producing a sample for above (2) are as follows. For Reference Example 3-16, DC power source 1 (Si target) 185 W, DC power source 2 (Sn target) 35 W, DC power source 3 (C target) 110 W. For Reference Example 3'-2, DC power source 1 (Si target) 185 W, DC power source 2 (Sn target) 22 W, DC power source 3 (C target) 0 W. For Reference Example 3'-7, DC power source 1 (Si target) 185 W, DC power source 2 (Sn target) 0 W, DC power source 3 (C target) 30 W.

Figure 17:
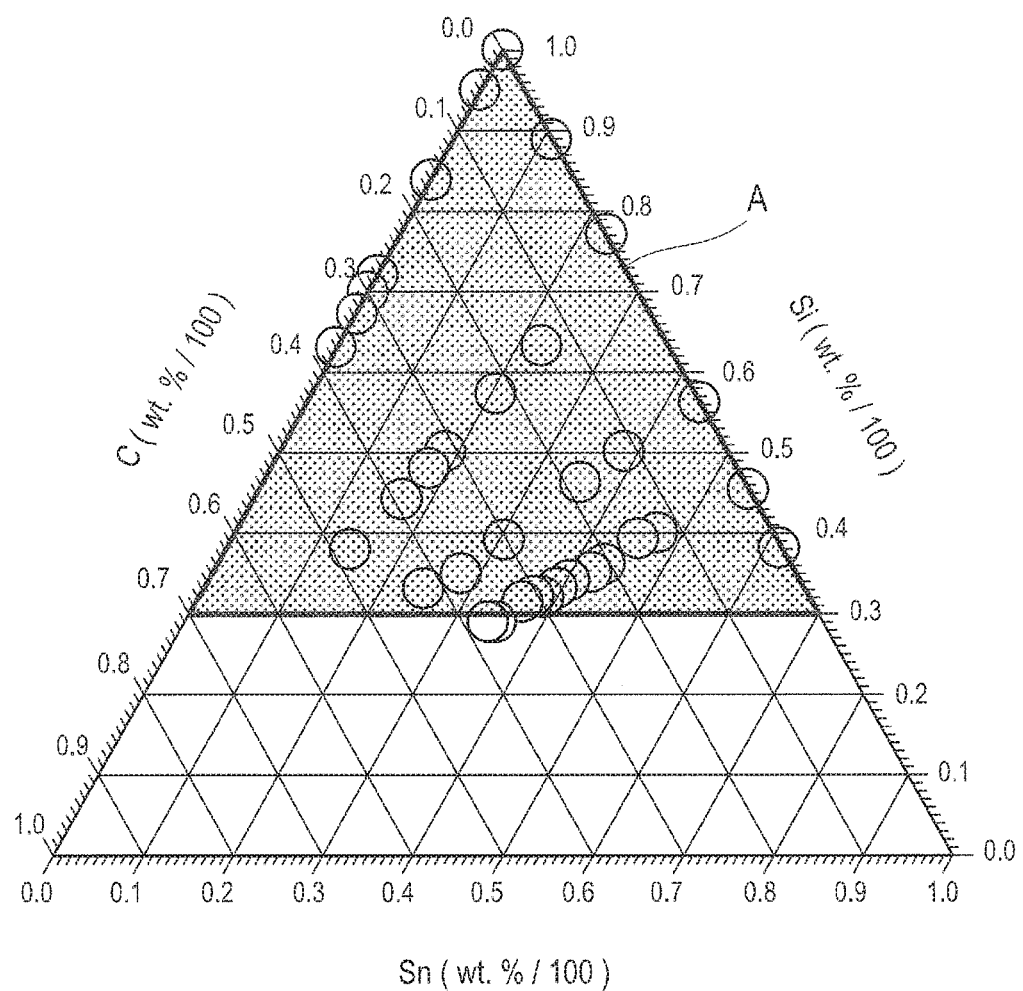
FIG. 17 is a ternary compositional diagram in which the alloy component formed into a film in Reference Example C is plotted, together with the preferred compositional range of Si—Sn—C based alloy constituting the negative electrode active material for an electric device of the present invention.

Component composition of those alloy thin films is described in Table 3 and FIG. 17.

[2] Fabrication of Battery

A CR2032 type coin cell was fabricated in the same manner as Reference Example A.

[3] Charge and Discharge Test of Battery

Charge and discharge test of a battery was performed in the same manner as Reference Example A. The results are shown in Table 3.

TABLE 3

|  | Composition (% by mass) | | | At the first cycle Discharge capacity | At the 50th cycle Discharge capacity | At the 100th cycle Discharge capacity |
|---|---|---|---|---|---|---|
|  | Si | Sn | C | (mAh/g) | retention rate(%) | retention rate(%) |
| Reference Example 3-1 | 63 | 23 | 14 | 2134 | 92 | 45 |

TABLE 3-continued

| | Composition (% by mass) | | | At the first cycle Discharge capacity (mAh/g) | At the 50$^{th}$ cycle Discharge capacity retention rate(%) | At the 100$^{th}$ cycle Discharge capacity retention rate(%) |
|---|---|---|---|---|---|---|
| | Si | Sn | C | | | |
| Reference Example 3-2 | 57 | 21 | 22 | 2005 | 92 | 47 |
| Reference Example 3-3 | 50 | 19 | 31 | 1632 | 92 | 48 |
| Reference Example 3-4 | 48 | 18 | 34 | 1628 | 92 | 49 |
| Reference Example 3-5 | 44 | 17 | 39 | 1571 | 92 | 50 |
| Reference Example 3-6 | 38 | 14 | 48 | 1262 | 92 | 51 |
| Reference Example 3-7 | 50 | 39 | 11 | 1710 | 92 | 48 |
| Reference Example 3-8 | 46 | 36 | 18 | 1582 | 96 | 49 |
| Reference Example 3-9 | 39 | 31 | 30 | 1310 | 95 | 52 |
| Reference Example 3-10 | 35 | 28 | 37 | 1250 | 92 | 52 |
| Reference Example 3-11 | 33 | 25 | 42 | 1089 | 92 | 52 |
| Reference Example 3-12 | 40 | 48 | 12 | 1741 | 97 | 55 |
| Reference Example 3-13 | 39 | 46 | 15 | 1685 | 98 | 56 |
| Reference Example 3-14 | 36 | 44 | 20 | 1583 | 97 | 57 |
| Reference Example 3-15 | 35 | 43 | 22 | 1525 | 96 | 55 |
| Reference Example 3-16 | 34 | 41 | 25 | 1466 | 99 | 60 |
| Reference Example 3-17 | 33 | 40 | 27 | 1456 | 97 | 57 |
| Reference Example 3-18 | 32 | 39 | 29 | 1423 | 96 | 57 |
| Reference Example 3-19 | 32 | 38 | 30 | 1403 | 97 | 58 |
| Reference Example 3-20 | 31 | 37 | 32 | 1381 | 98 | 60 |
| Reference Example 3-21 | 29 | 35 | 36 | 1272 | 97 | 60 |
| Reference Example 3-22 | 29 | 34 | 37 | 1184 | 98 | 59 |
| Reference Example 3'-1 | 100 | 0 | 0 | 3232 | 47 | 22 |
| Reference Example 3'-2 | 89 | 11 | 0 | 3149 | 78 | 36 |
| Reference Example 3'-3 | 77 | 23 | 0 | 2622 | 84 | 38 |
| Reference Example 3'-4 | 56 | 44 | 0 | 1817 | 91 | 42 |
| Reference Example 3'-5 | 45 | 55 | 0 | 1492 | 91 | 42 |
| Reference Example 3'-6 | 38 | 62 | 0 | 1325 | 91 | 42 |
| Reference Example 3'-7 | 95 | 0 | 5 | 3284 | 58 | 37 |
| Reference Example 3'-8 | 84 | 0 | 16 | 3319 | 64 | 38 |
| Reference Example 3'-9 | 72 | 0 | 28 | 3319 | 51 | 29 |
| Reference Example 3'-10 | 70 | 0 | 30 | 3409 | 68 | 33 |
| Reference Example 3'-11 | 67 | 0 | 33 | 3414 | 54 | 27 |
| Reference Example 3'-12 | 63 | 0 | 37 | 3360 | 59 | 27 |

Figure 18:
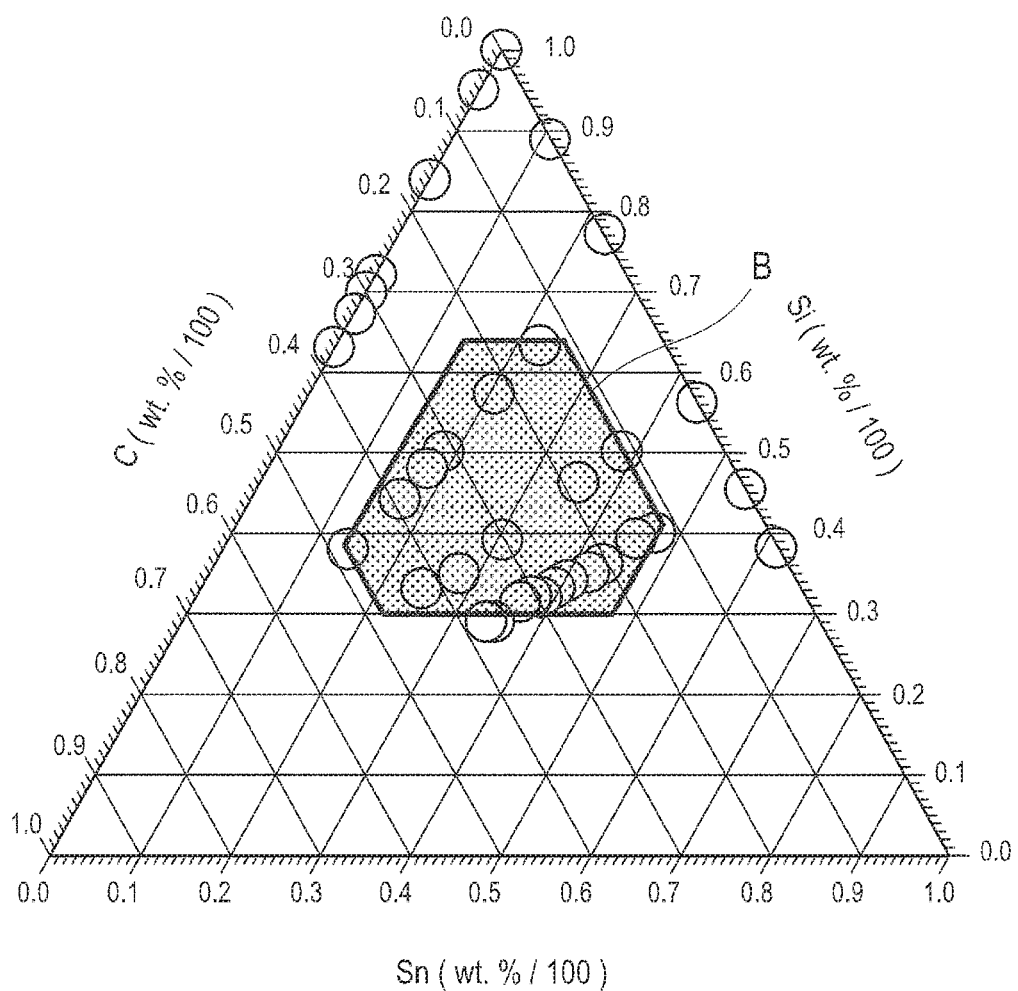
FIG. 18 is a ternary compositional diagram illustrating more preferred compositional range of Si—Sn—C based alloy constituting the negative electrode active material for an electric device of the present invention.
Figure 21:
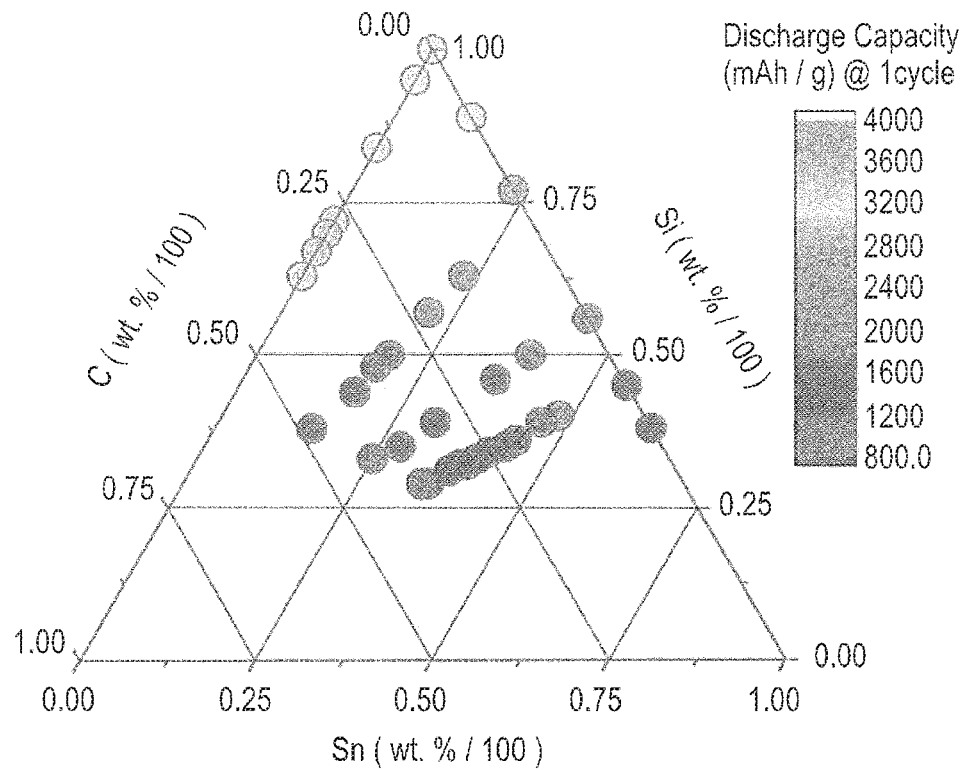
FIG. 21 is a drawing illustrating the influence of the composition of a negative electrode active material alloy on initial discharge capacity of the battery obtained in Reference Example C.
Figure 22:
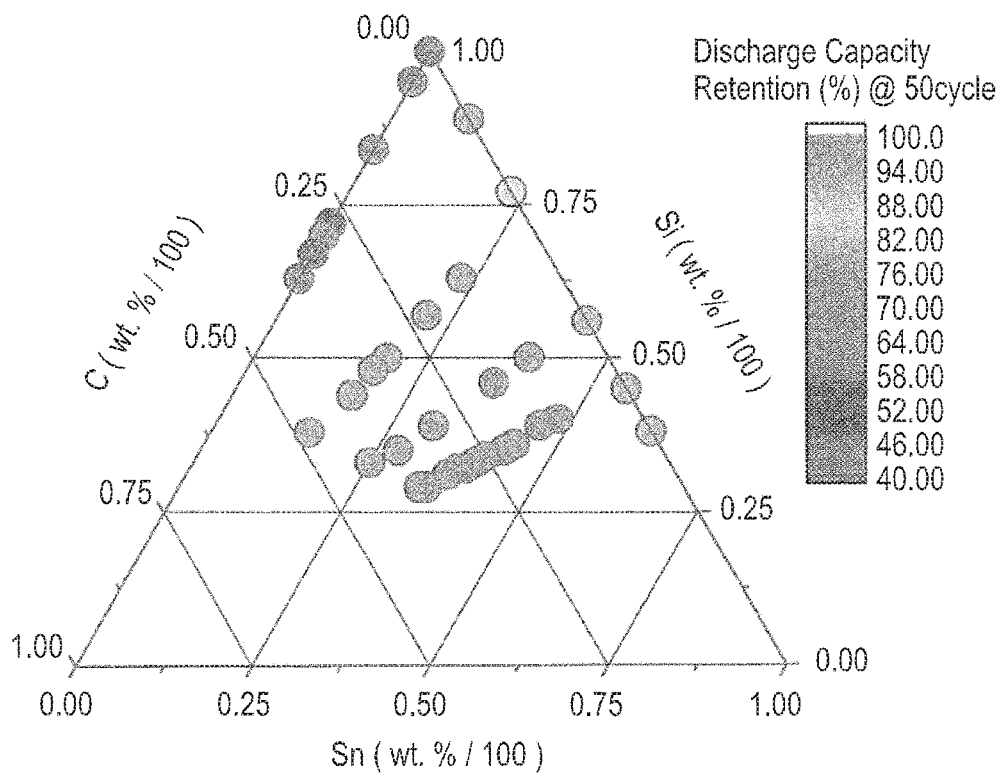
FIG. 22 is a drawing illustrating the influence of the composition of a negative electrode active material alloy on discharge capacity retention rate at the 50$^{th}$ cycle of the battery obtained in Reference Example C.
Figure 23:
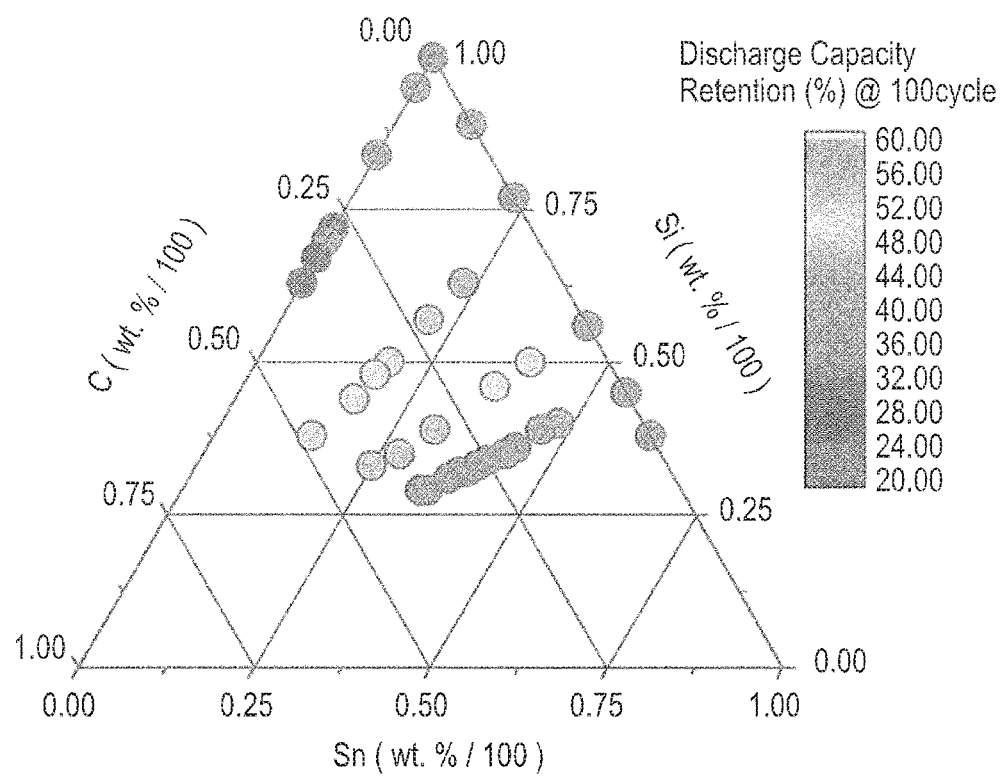
FIG. 23 is a drawing illustrating the influence of the composition of a negative electrode active material alloy on discharge capacity retention rate at the 100$^{th}$ cycle of the battery obtained in Reference Example C.

Based on the results above, the battery of Reference Example C (see, Table 3) in which Si—Sn—C based alloy containing Si in an amount of 29% by mass or more, that is, in the range B shown in FIG. 18, is used as a negative electrode active material, has the initial capacity exceeding at least 1000 mAh/g as shown in FIG. 21. Furthermore, as shown in FIG. 22 and FIG. 23, regarding the negative electrode active material composed of Si—Sn—C based alloy within the range B shown in FIG. 18, it was confirmed that the discharge capacity retention rate was 92% or more after 50 cycles and was 45% or more even after 100 cycles (see, Reference Examples 3-1 to 3-22).

Next, as Examples, performance evaluation was performed for a negative electrode for an electric device having a negative electrode active material layer in which, among the aforementioned Si alloys, $Si_{60}Sn_{20}Ti_{20}$ produced in the same manner as Reference Example A is used as negative electrode active material.

Meanwhile, a similar or the same result as the following Example using $Si_{60}Sn_{20}Ti_{20}$ are obtained from $Si_{60}Sn_{20}Ti_{20}$ or other alloys used in the present invention ($Si_xSn_yTi_zA_a$, $Si_xSn_yZn_zA_a$, and $Si_xSn_yC_zA_a$, other than $Si_{60}Sn_{20}Ti_{20}$). That is because the important factor for having improved cycle durability of a Si alloy is considered to be the progress level of Si amorphization in an active material, and Ti, Zn and C (second added element) are to facilitate the amorphization state according to alloying of Si material. Accordingly, even for $Si_xSn_yZn_zA_a$ and $Si_xSn_yC_zA_a$ in which Zn and C are used instead of Ti, it is considered that the cycle durability is more improved as the Si amorphous state proceeds. Namely, if an alloy with the same characteristics is used, the same results may be obtained even when the type of an alloy is changed.

Example 1

[Production of Si Alloy]

Si alloy was produced by mechanical alloying method (or arc plasma melt method). Specifically, by using a planetary ball mill device P-6 manufactured by Fritsch, Germany, pulverization balls made of zirconia and raw material powder of each alloy were added to a pulverization pot made of zirconia, and alloying was performed for 12 hours at 600 rpm (alloying treatment). After that, it was subjected to a pulverization treatment for 1 hour at 400 rpm.

[Production of Negative Electrode]

80 parts by mass of the Si alloy ($Si_{60}Sn_{20}Ti_{20}$, particle diameter of 0.3 µm) produced above as a negative electrode active material, 5 parts by mass of acetylene black as a conductive acid, and 15 parts by mass of polyamideimide as a binder were mixed and dispersed in N-methyl pyrrolidone (NMP) to prepare a slurry of negative electrode active material. Subsequently, the obtained negative electrode slurry was evenly coated on both surfaces of negative electrode current collector, which is composed of a copper foil, to have thickness of 30 µm followed by drying for 24 hours in vacuum to obtain a negative electrode.

[Production of Positive Electrode]

As a positive electrode active material, $Li_{1.85}Ni_{0.18}Co_{0.10}Mn_{0.87}O_3$ was produced according to the method described in Example 1 (paragraph 0046) of JP-A-2012-185913. Then, 90 parts by mass of this positive electrode active material, 5 parts by mass of acetylene black as a conductive acid, and 5 parts by mass of polyvinylidene fluoride as a binder were dmixed and dispersed in N-methyl pyrrolidone to prepare a slurry of positive electrode active material. Subsequently, the obtained positive electrode slurry was evenly coated on both surfaces of positive electrode current collector, which consists of an aluminum foil, to have thickness of 30 µm followed by drying to obtain a positive electrode.

[Fabrication of Battery]

The positive electrode and negative electrode which have been produced above were placed to face each other, and a separator (polyolefin, film thickness of 20 µm) was disposed between them. Subsequently, a laminate of the negative electrode, the separator, and the positive electrode was placed in a bottom part of a coin cell (CR2032, material: stainless steel (SUS316)). In addition, to maintain the insulating property between the positive electrode and negative electrode, a gasket was applied. The following electrolyte solution was injected by using a syringe and a spring and a spacer were stacked. By overlaying the top part of the coin cell and swaging, a lithium ion secondary battery was obtained.

Meanwhile, as for the aforementioned electrolyte solution, a solution having lithium hexafluorophosphate ($LiPF_6$) as a support salt dissolved at 1 mol/L concentration in a organic solvent of ethylene carbonate (EC) and diethyl carbonate (DEC) mixed at EC:DC=1:2 (volume ratio) was used.

Example 2

A negative electrode and a battery were produced in the same manner as Example 1 except that the time for alloying treatment was changed to 24 hours.

Example 3

A negative electrode and a battery were produced in the same manner as Example 1 except that the time for alloying treatment was changed to 48 hours.

Comparative Example

A negative electrode and a battery were produced in the same manner as Example 1 except that the time for alloying treatment was changed to 5 hours.

<Performance Evaluation>

[X Ray Diffraction of Si Alloy]

Apparatus: X ray diffractometer manufactured by Rigaku Corporation (SmartLab9 kW)

Voltage.current: 45 kV.200 mA

X ray wavelength: CuKα 1

Figure 24:
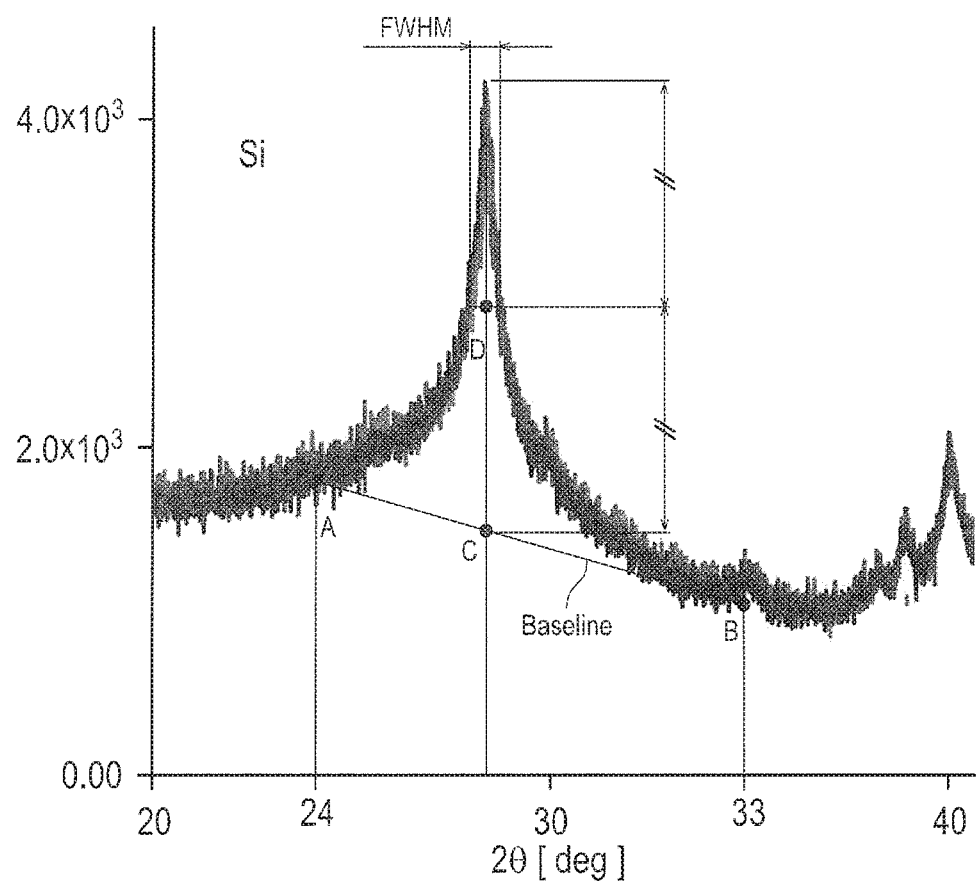
FIG. 24 is a drawing illustrating the method for calculating the half width (FWHM) of the diffraction peak of (111 surface) of Si by X ray diffraction spectrum.

From the obtained X ray diffraction spectrum, the half width (FWHM) was obtained according to the method shown in the following 1. to 6. and FIG. 24.

1. In the result of X ray diffraction (XRD), the point at which the vertical line at 2θ of 24° and X ray diffraction pattern cross each other is taken as A. Furthermore, the point at which the vertical line at 2θ of 33° and X ray diffraction pattern cross each other is taken as B;

2. The above A and B are connected to each other via a straight line (herein, this line is referred to as a base line);

3. The point at which the vertical line at the diffraction peak (about of 28.5°) of the 111 surface of Si and the above base line cross each other is taken as C;

4. The line connecting the top point of the diffraction peak of the 111 surface of Si to the C is cut in half (the center point after cut in half is taken as D);

5. A parallel line passing through the D is drawn; and

6. The distance between two points at which the parallel line and the X ray diffraction pattern cross each other is determined as half width (FWHM).

[Evaluation of Cycle Durability]

According to the following method, evaluation of cycle durability was performed for each lithium ion secondary battery which has been produced above. At a constant current and constant voltage mode (CCCV, current: 0.1 C, terminated after 20 hours), the battery was charged to 4.2 V under 30° C. atmosphere. Then, after resting for 10 minutes, the battery was discharged to 2 V at constant current (CC, current: 0.1 C) followed by resting for 10 minutes after discharge. This charge and discharge process was taken as the first cycle, and the charge and discharge test was performed until the 90$^{th}$ cycle under the same charge and discharge conditions as the first cycle for the 2$^{nd}$ and following cycles except that both charge and discharge were performed at 0.5 C (CCCV for charge was terminated after 4 hours). The results obtained for the ratio of the discharge capacity at the 90$^{th}$ cycle to the discharge capacity at the 1$^{st}$ cycle (discharge capacity retention rate [%]) were shown in the following Table 4 and FIG. 25.

TABLE 4

|  | FWHM (deg) | Discharge capacity retention rate after 90 cycles(%) |
|---|---|---|
| Example 1 | 0.7 | 38 |
| Example 2 | 1.1 | 49 |
| Example 3 | 1.4 | 75 |
| Comparative Example | 0.16 | 25 |

Figure 25:
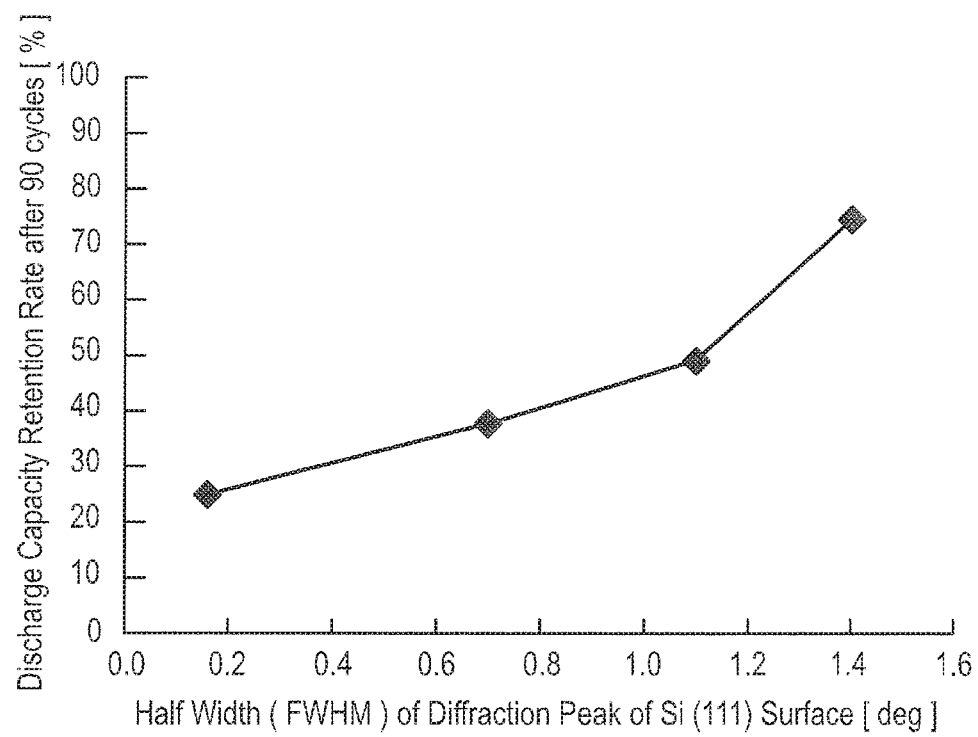
FIG. 25 is a drawing illustrating the results of Examples 1 to 3 and Comparative Example.

From the results of Table 4 and FIG. 25, it is understood that the batteries according to Examples 1 to 3 of which the half width (FWHM) of the diffraction peak of the (111) surface of Si in the range of 2θ=24 to 33° by X ray diffraction measurement of the Si alloy using CuKα ray is within the range of the present invention exhibit high cycle durability.

What is claimed is:

1. A negative electrode active material for an electric device comprising an alloy represented by the following chemical formula (1):

$$Si_xSn_yM_zA_a \quad (1)$$

wherein M is Zn, A is unavoidable impurities, x, y, z, and a represent % by mass values, and in that case, 23<x<64, 4≤y<34, 0<z<65, 0≤a<0.5, and x+y+z+a=100, wherein the alloy is a ternary alloy having a uniform composition ratio throughout, and the half width of the diffraction peak of the (111) surface of Si in the range of 2θ=24 to 33° by X ray diffraction measurement of the alloy using CuKα ray is 1.4° or more and less than 9°.

2. The negative electrode active material for an electric device according to claim 1, wherein the z is more than 27 and less than 61.

3. The negative electrode active material for an electric device according to claim 2, wherein the y is less than 24 and the z is more than 38.

4. The negative electrode active material for an electric device according to claim 2, wherein the x is 24 or more and less than 38.

5. An electric device comprising the negative electrode active material for an electric device set forth in claim 1.

* * * * *